United States Patent
Inokuchi et al.

(10) Patent No.: US 12,321,461 B2
(45) Date of Patent: Jun. 3, 2025

(54) ATTACK GRAPH PROCESSING DEVICE, METHOD, AND PROGRAM

(71) Applicant: NEC Corporation, Tokyo (JP)

(72) Inventors: Masaki Inokuchi, Tokyo (JP); Yoshinobu Ohta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 527 days.

(21) Appl. No.: 17/617,619

(22) PCT Filed: Jun. 17, 2019

(86) PCT No.: PCT/JP2019/023832
§ 371 (c)(1),
(2) Date: Dec. 9, 2021

(87) PCT Pub. No.: WO2020/255185
PCT Pub. Date: Dec. 24, 2020

(65) Prior Publication Data
US 2022/0237303 A1    Jul. 28, 2022

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC ............. G06F 21/577; G06F 2221/034; H04L 63/1433; H04L 63/1416; H04L 41/145; H04L 43/045
See application file for complete search history.

(56) References Cited

U.S. PATENT DOCUMENTS

| | | | |
|---|---|---|---|
| 2005/0138413 A1* | 6/2005 | Lippmann | G06F 21/577 726/4 |
| 2007/0226796 A1* | 9/2007 | Gilbert | G06F 21/577 726/25 |
| 2015/0074806 A1 | 3/2015 | Roundy et al. | |
| 2015/0128211 A1 | 5/2015 | Kirner et al. | |

(Continued)

FOREIGN PATENT DOCUMENTS

| | | |
|---|---|---|
| JP | 2008-250680 A | 10/2008 |
| JP | 2015-130153 A | 7/2015 |

(Continued)

OTHER PUBLICATIONS

International Search Report for PCT Application No. PCT/JP2019/023832, mailed on Sep. 10, 2019.

(Continued)

*Primary Examiner* — Yogesh Paliwal

(57) ABSTRACT

An attack graph processing device includes a node extraction unit which extracts a node relating to a rule classified into a predetermined group from an attack graph that is configured from one or more nodes indicating the state of a system to be diagnosed, or the state of the primary agent of an attack on the system to be diagnosed, and one or more edges indicating the relationship among a plurality of nodes, the attack graph being generated using rules indicating a condition in which the attack can be executed, and a graph configuration unit which simplifies the attack graph on the basis of the extracted node.

20 Claims, 19 Drawing Sheets

(56) References Cited

U.S. PATENT DOCUMENTS

| | | | |
|---|---|---|---|
| 2016/0205122 A1* | 7/2016 | Bassett | H04L 63/1441 |
| | | | 726/23 |
| 2017/0286690 A1* | 10/2017 | Chari | G06F 21/577 |
| 2020/0053116 A1* | 2/2020 | Soroush | H04L 43/045 |
| 2020/0134076 A1* | 4/2020 | Ogrinz | G06F 7/14 |
| 2020/0175071 A1* | 6/2020 | Ogrinz | G06F 16/284 |
| 2020/0177617 A1* | 6/2020 | Hadar | G06F 16/9024 |

FOREIGN PATENT DOCUMENTS

| | | |
|---|---|---|
| JP | 2016-528656 A | 9/2016 |
| JP | 2016-206943 A | 12/2016 |
| JP | 2016-540463 A | 12/2016 |

OTHER PUBLICATIONS

English translation of Written opinion for PCT Application No. PCT/JP2019/023832, mailed on Sep. 10, 2019.
X Ou et al., "MulVAL: A logic-based network security analyzer," USENIX Association, 14th USENIX Security Symposium, pp. 113-128, 2005.

* cited by examiner

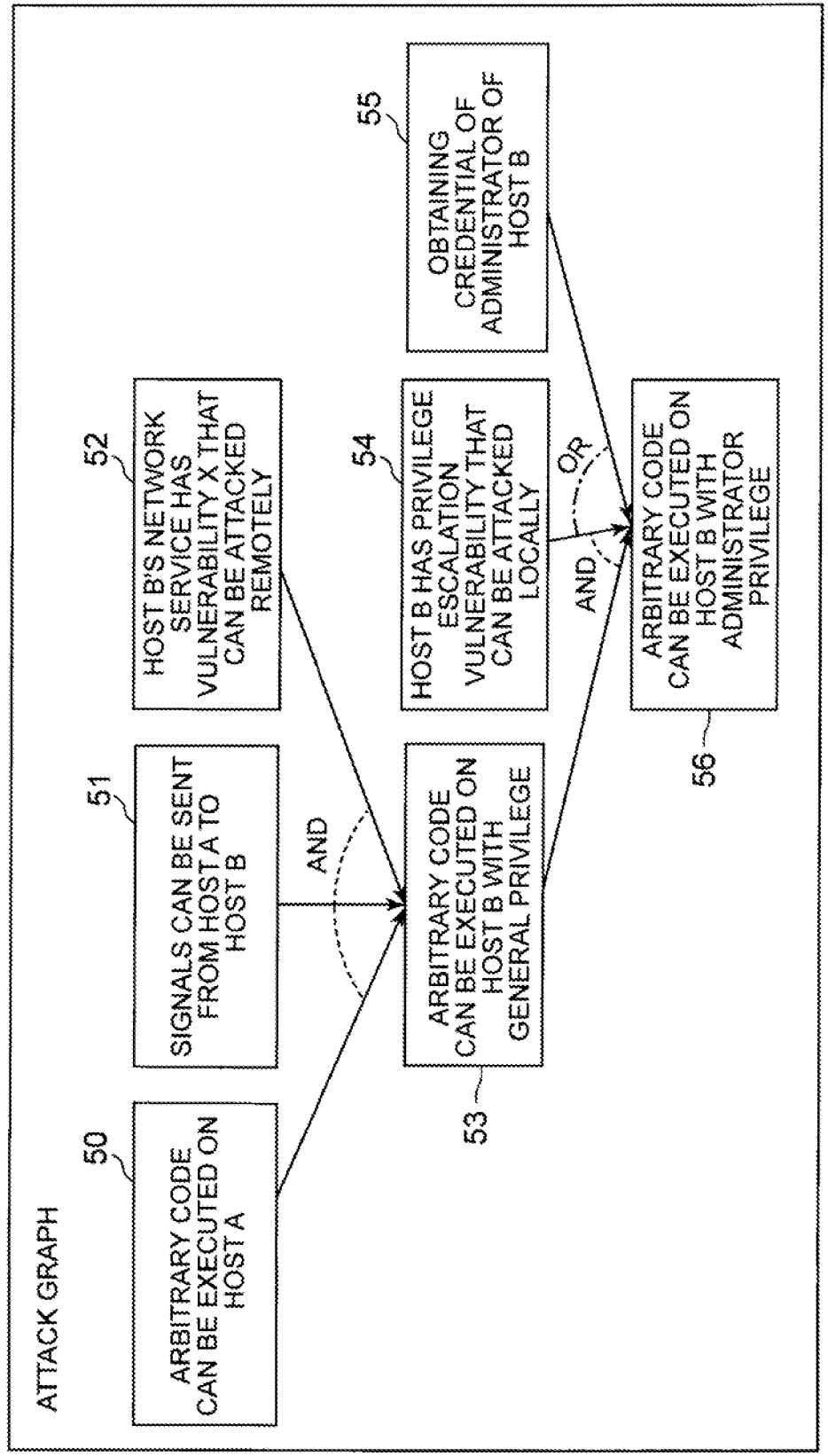

FIG. 2

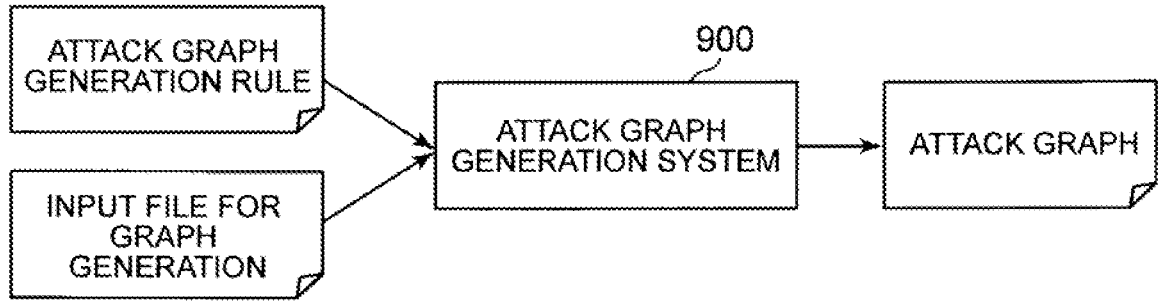

FIG. 3

ATTACK GRAPH GENERATION RULE

```
execCode(H, Perm): -
        vulExists(H, _, Software, remoteExploit, privEscalation),
        networkServiceInfo(H, Software, Protocol, Port, Perm),
        netAccess(H, Protocol,Port)
```

FIG. 4

INPUT FILE FOR GRAPH GENERATION

```
attackerLocated(zoneA).
attackGoal(execCode(hostX,admin)).

hacl(zoneA,hostX,tcp,80).
vulExists(hostX,cveXXXX,vulSoftware,remoteExploit,privEscalation).
networkServiceInfo(hostX,vulSoftware,tcp,80,admin).
```

FIG. 8

ATTACK GRAPH GENERATION RULE

```
execCode3(Principal, Host, admin): -
        localAccess3(Principal, Host, User),
        localService3(Host, Prog, User),
        vulSoftware5(Host, _vulID, Prog, localEploit, privEsc),
        maliciousI(Principal)
```

FIG. 9

ATTACK GRAPH GENERATION RULE

```
l2Connection5(SrcHost, DstHost, Subnet, Prot, ipSubnet): -
        located3(SrcHost, Subnet, ipSubnet),
        located3(DstHost, Subnet, ipSubnet)
```

FIG. 12
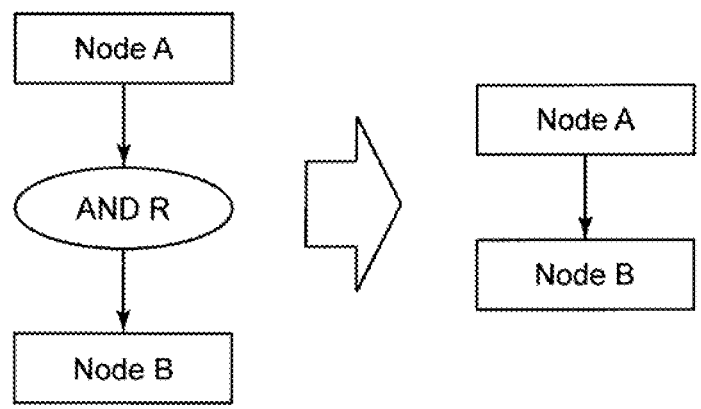
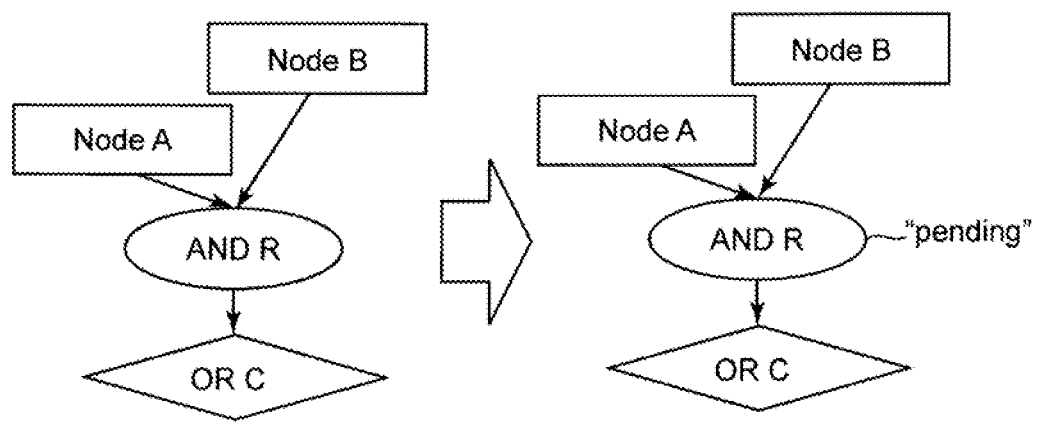

FIG. 13
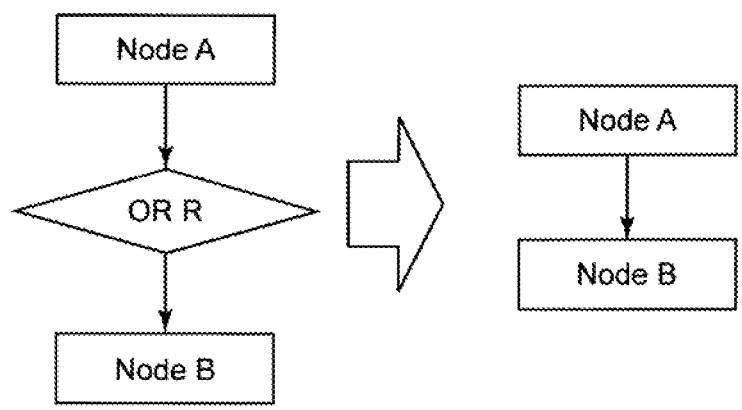
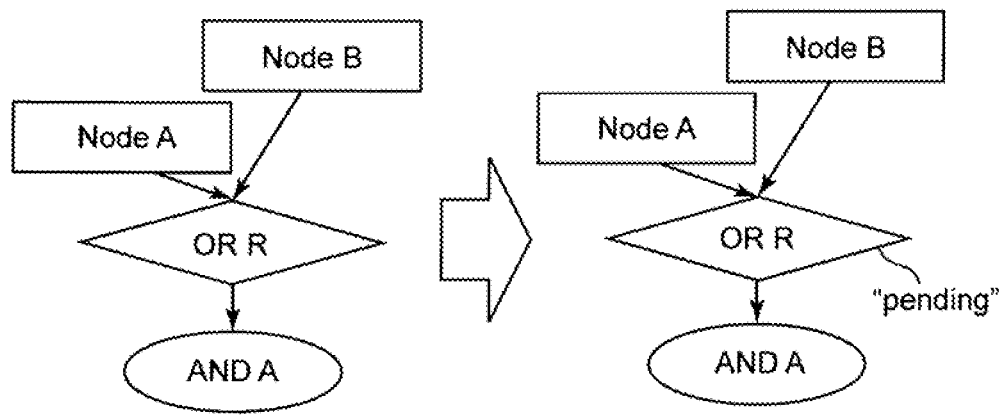

FIG. 14
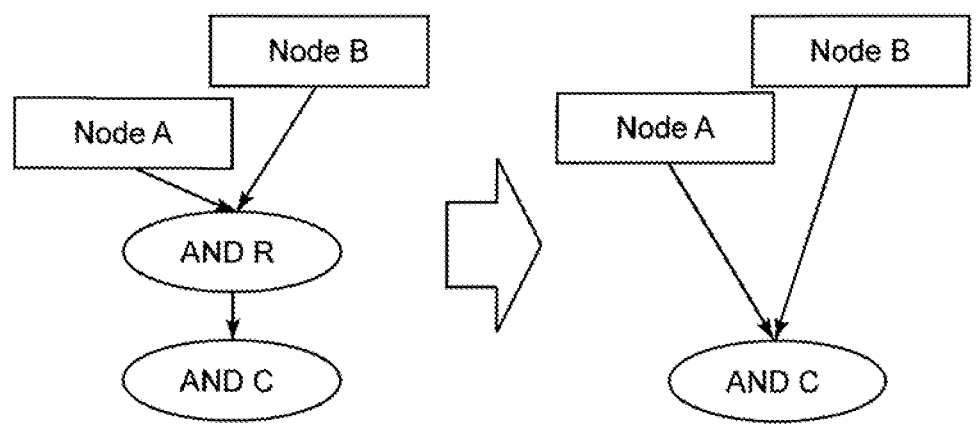
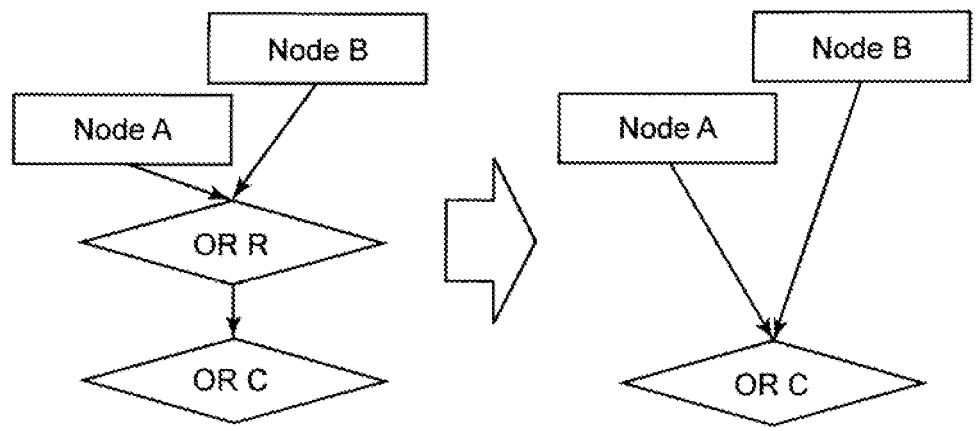

ATTACK GRAPH PROCESSING DEVICE, METHOD, AND PROGRAM

This application is a National Stage Entry of PCT/JP2019/023832 filed on Jun. 17, 2019, the contents of all of which are incorporated herein by reference, in their entirety.

TECHNICAL FIELD

The present invention relates to an attack graph processing device, an attack graph processing method, and an attack graph processing program.

BACKGROUND ART

It is required to take security measures to protect information assets from such as cyber-attacks in a system to be diagnosed represented by an information processing system including multiple computers, etc. The security measures include diagnosing such as a vulnerability of the target system and removing the vulnerability if necessary.

Also, Patent Literature(PTL) 1 describes a security requirement analysis support device that can support even unskilled persons to perform security analysis at a level equivalent to that of skilled persons efficiently and at a low cost when analyzing system requirement definitions that take security into account.

PTL 2 also describes a cyber attack analysis device capable of analyzing the activities of targeted attacks and malware, and predicting future trends of attacks. PTL 3 also describes a system for detecting attacks against a computing system using an event correlation graph.

In addition, Non Patent Literature (NPL) 1 describes an existing security analysis tool called MulVAL.

CITATION LIST

Patent Literature

PTL 1: Japanese Patent Application Laid-Open No. 2008-250680
PTL 2: Japanese Patent Application Laid-Open No. 2016-206943
PTL 3: Japanese Translation of PCT International Application Publication No. 2016-528656

Non Patent Literature

NPL 1: X. Ou, S. Govindavajhala, and A. Appel, "MulVAL: A logic-based network security analyzer," USENIX Association, 14th USENIX Security Symposium, pp. 113-128, 2005.

SUMMARY OF INVENTION

Technical Problem

The system that is the target of security diagnosis is described as the system to be diagnosed. In order for the security administrator (hereinafter, referred to simply as the administrator) to take effective countermeasures against possible attacks on the system to be diagnosed, the possible attacks on the system to be diagnosed must be presented to the security administrator in an easy-to-understand manner.

Therefore, it is an object of the present invention to provide an attack graph processing device, an attack graph processing method, and an attack graph processing program that can easily analyze the attacks in the system to be diagnosed.

Solution to Problem

An attack graph processing device according to the present invention is an attack graph processing device includes a node extraction unit which extracts a node relating to a rule classified into a predetermined group from an attack graph that is configured from one or more nodes indicating the state of a system to be diagnosed, or the state of the primary agent of an attack on the system to be diagnosed, and one or more edges indicating the relationship among a plurality of nodes, the attack graph being generated using rules indicating a condition in which the attack can be executed, and a graph configuration unit which simplifies the attack graph on the basis of the extracted node.

An attack graph processing method according to the present invention is an attack graph processing method includes extracting a node relating to a rule classified into a predetermined group from an attack graph that is configured from one or more nodes indicating the state of a system to be diagnosed, or the state of the primary agent of an attack on the system to be diagnosed, and one or more edges indicating the relationship among a plurality of nodes, the attack graph being generated using rules indicating a condition in which the attack can be executed, and simplifying the attack graph on the basis of the extracted node.

An attack graph processing program according to the present invention, causing a computer to execute an extraction process of extracting a node relating to a rule classified into a predetermined group from an attack graph that is configured from one or more nodes indicating the state of a system to be diagnosed, or the state of the primary agent of an attack on the system to be diagnosed, and one or more edges indicating the relationship among a plurality of nodes, the attack graph being generated using rules indicating a condition in which the attack can be executed, and a simplification process of simplifying the attack graph on the basis of the extracted node.

Advantageous Effects of Invention

According to the present invention, it is possible to easily analyze the attacks in the system to be diagnosed.

BRIEF DESCRIPTION OF DRAWINGS

FIG. 1 is an explanatory diagram showing an example of an attack graph.
FIG. 2 is an explanatory diagram showing an example of an attack graph generation system.
FIG. 3 is an explanatory diagram showing an example of an attack graph generation rule.
FIG. 4 is an explanatory diagram showing an example of an input file for graph generation.
FIG. 8 is an explanatory diagram showing another example of an attack graph generation rule.

FIG. 9 is an explanatory diagram showing another example of an attack graph generation rule.

FIG. 12 is an explanatory diagram showing an example of a process of deleting a node by the graph configuration unit 120.

FIG. 13 is an explanatory diagram showing another example of a process of deleting a node by the graph configuration unit 120.

FIG. 14 is an explanatory diagram showing another example of a process of deleting a node by the graph configuration unit 120.

DESCRIPTION OF EMBODIMENTS

Figure 5:
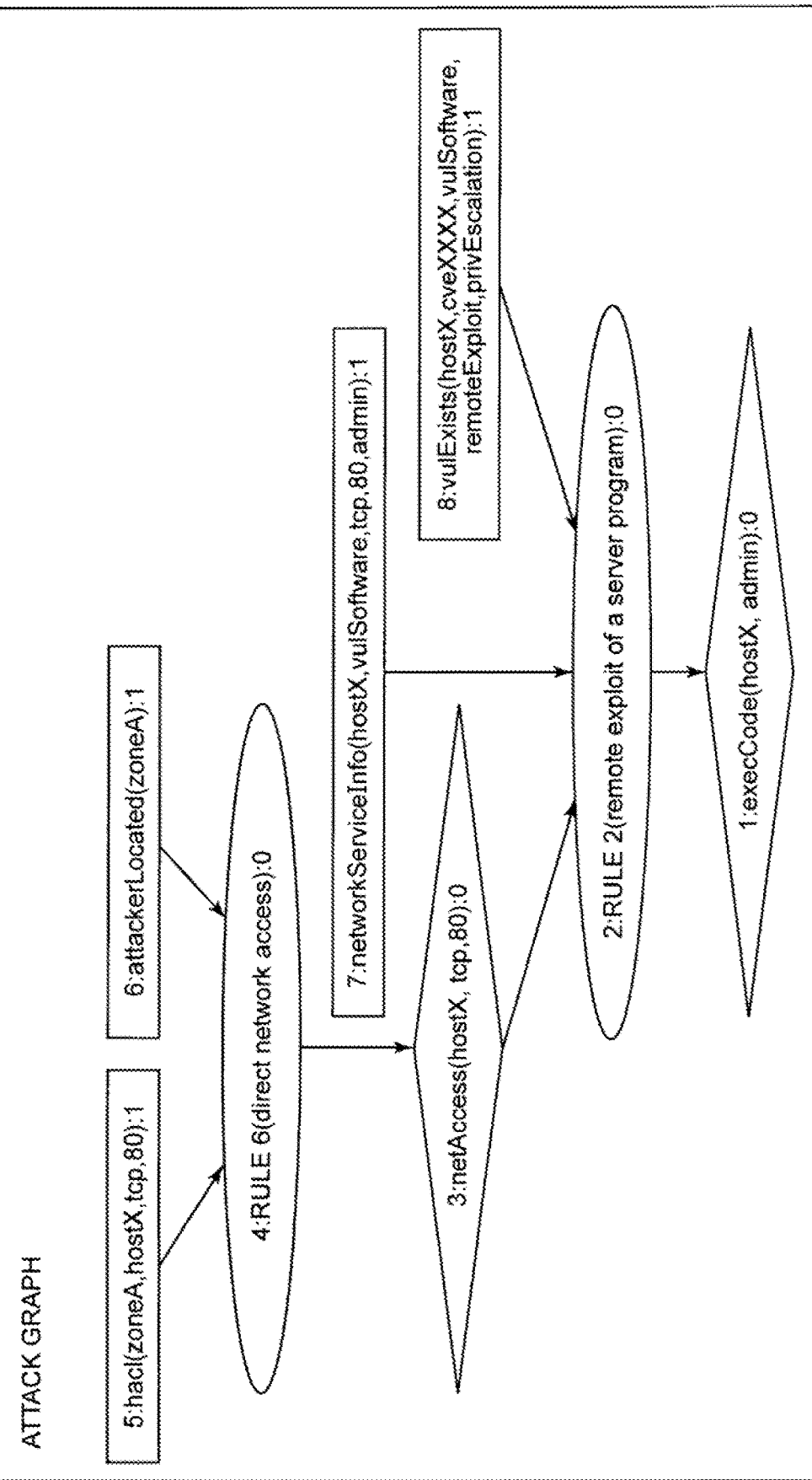
FIG. 5 is an explanatory diagram showing an example of an attack graph generated by an attack graph generation system 900.

Hereinafter, example embodiments of the present invention will be described with reference to the drawings. First, the matters assumed in each example embodiment of the present invention are described.

An attack graph is a graph configured from one or more nodes indicating the state of a system, or the state of the primary agent of an attack on the system, and one or more edges indicating the relationship among a plurality of nodes. The system state is, for example, the state of an operating system (OS) used, the state of software, the state of vulnerabilities, and the state of the network configuration. The state of the primary agent of an attack is, for example, the state of being able to log in or communicate with a certain host.

The following types of relationships can be considered as those described above.

For example, a relationship related to an attack can be considered. The relationship related to an attack indicates a state of affairs (consequence) that is made possible by an attack when certain preconditions are satisfied, and that is reached as a result of that attack.

For example, a relationship that represents a property related to the state of the primary agent of an attack is also considered. The relationship that represents a property related to the state of the primary agent of an attack indicates what state the primary agent of an attack will reach when it reaches a certain state. For example, if a host can be logged into, the relationship that enables communication with a neighboring host is applicable.

For example, a relationship that represents a property of a system state is also considered. The relationship that represents the property of the system state indicates what state will reach when it reaches a certain system state. For example, a relationship such as a state in which communication between certain hosts becomes possible when the logical network configuration is changed by rewriting the rules of a firewall is applicable.

An attack graph expresses what kind of attack flow the primary agent of an attack goes through from the initial state to what state by making the node derived by certain relationship the premise of another relationship. Hereafter, the attack flow expressed by the attack graph is called the attack path.

An attack path basically consists of one or more nodes. Also, if a node representing an attack that is determined to be executable in the system to be diagnosed is a precondition for the next attack, the attack graph can express an attack that consists of multiple steps.

FIG. 1 is an explanatory diagram showing an example of an attack graph. Nodes 50 to 52 and nodes 54 to 55 shown in FIG. 1 represent the conditions for an attack to become executable, respectively. In addition, nodes 53 and 56 shown in FIG. 1 represent attacks that have been determined to be executable in the system to be diagnosed, respectively.

For example, the attack graph shown in FIG. 1 means that the attack "Arbitrary code can be executed on host B with general privilege" can be executed when the three conditions are satisfied: "Arbitrary code can be executed on host A", "Signals can be sent from host A to host B", and "Host B's network service has vulnerability X that can be attacked remotely".

The attack "Arbitrary code can be executed on host B with general privilege" corresponds to the attack path consisting of nodes 50-53. In addition, "AND" shown in FIG. 1 means that each condition in the attack path has a logical product relationship, i.e., the attack can be executed when all the conditions are satisfied, and the attack cannot be executed otherwise.

In addition, the attack graph shown in FIG. 1 means that the attack "Arbitrary code can be executed on host B with administrator privilege" can be executed when two conditions are satisfied: "Arbitrary code can be executed on host B with general privilege" and "Host B has a privilege escalation vulnerability that can be attacked locally". Also, this means that the attack "Arbitrary code can be executed on host B with administrator privilege" can be executed when the condition "Obtaining credentials of the administrator of host B" is satisfied.

The attack "Arbitrary code can be executed on host B with administrator privilege" corresponds to an attack path consisting of nodes 50-56. In addition, "OR" shown in FIG. 1 means that each condition in the attack path has a logical sum relationship, i.e., the attack can be executed when at least one of the conditions is satisfied, and the attack cannot be executed when none of the conditions is satisfied.

A "Vulnerability that can be attacked remotely" is a vulnerability that can be attacked through a communication network. A "Vulnerability in host that can be attacked locally" is a vulnerability that can be attacked while the user is logged into the host or can execute code in the host. Vulnerabilities are classified into two categories: locally attackable vulnerabilities and remotely attackable vulnerabilities.

A privilege escalation vulnerability is a vulnerability that allows code execution or file access with privilege that the primary agent of an attack does not originally possess. Also, credentials mean all the information used for authentication (for example, a set of IDs and passwords).

Next, an example of a system that automatically generates an attack graph is described. FIG. 2 is an explanatory diagram showing an example of an attack graph generation system.

The attack graph generation system 900 shown in FIG. 2 is a system that automatically generates attack graphs using attack graph generation rules (hereinafter, referred to simply as rules) and an input file for graph generation.

The attack graph generation rule shown in FIG. 2 is a rule that represents the relationship between the attack and each element in the system to be diagnosed. For example, a rule that derives another state from a combination of multiple states that are assumed is used as an attack graph generation rule.

The attack graph generation rule can represent the state of the system to be diagnosed or the state of the primary agent of an attack by being marked with predicates that contain the identifiers of the components of the system to be diagnosed or the identifiers of the primary agent of an attack as arguments.

The attack graph generation rules also represent the relationships between predicates. For example, an attack graph generation rule can be described on the basis of first-order predicate logic.

Hereinafter, specific examples of the attack graph generation rules are described with reference to FIGS. 3-4. Note that, each argument of the predicates shown in FIGS. 3-4 corresponds to a label or an identifier that expresses some entity or parameter. By assigning labels or identifiers to those arguments, each predicate can express a state related to a concrete entity.

FIG. 3 is an explanatory diagram showing an example of an attack graph generation rule. The attack graph generation rule shown in FIG. 3 is described in the representation used in MulVAL, which is described in NPL 1.

The attack "execCode(H, Perm):-" in the first line shown in FIG. 3 means that the primary agent of an attack can execute the code with Perm privilege (access privilege) at host H.

In addition, the precondition "vulExists(H,_, Software, remoteExploit, privEscalation)," in the second line shown in FIG. 3, means that the software Software of the host H has a privilege escalation vulnerability "privEscalation" that can be attacked remotely (remoteExploit).

In the above examples, labels and identifiers can be assigned to the arguments H and Software, but remoteExploit and privEscalation are specific labels that mean "remotely attackable" and "privilege escalation", respectively. Hereinafter, for predicates in the attack graph generation rules, some label or identifier can be assigned to each argument, except when it is explicitly stated that the argument is in a state where a specific label is assigned to it.

In addition, the precondition "networkServiceInfo(H, Software, Protocol, Port, Perm)," in the third line shown in FIG. 3 means that the software Software is executed with the privilege Perm in the host H, and the communication of the protocol Protocol is listened for the port number Port.

In addition, the precondition "netAccess(H, Protocol, Port)" in the fourth line shown in FIG. 3 means that the primary agent of an attack can communicate with host H by the protocol Protocol and port number Port, i.e., the data can be reached.

When all preconditions in lines 2 to 4 shown in FIG. 3 are satisfied, the attack (execCode) in line 1 shown in FIG. 3 can be executed. In other words, the attack graph generation rules correspond to the rules that indicate the conditions under which the attack corresponding to the attack path represented by the attack graph can be executed. Note that "the attack can be executed" means that a third party knows that the attack can be executed.

The input file for graph generation shown in FIG. 2 is a file that describes the information used for graph generation, such as the state of the assessment target system or the primary agent of an attack, premise, and vulnerability information.

The input file for graph generation shown in FIG. 2 can be configured by enumerating the predicates used in the attack graph generation rules by assigning specific labels and identifiers to the arguments as necessary. The labels and identifiers are assigned to each argument in the specific examples of the input file for graph generation described below.

FIG. 4 is an explanatory diagram showing an example of an input file for graph generation. The first line of information shown in FIG. 4, "attackerLocated(zoneA)." means that the primary agent of an attack is located in the zone zoneA, which is a subnet.

Also, the second line of information shown in FIG. 4, "attackGoal(execCode(hostX,admin))." means that the attack goal is to make arbitrary code executable on host hostX with the privilege admin.

Also, the third line of information shown in FIG. 4, "hacl(zoneA,hostX,tcp,80)." means that the communication between the zone zoneA and the host hostX is possible with the protocol TCP (transmission control protocol) and the port number 80.

Also, the fourth line of information shown in FIG. 4, "vulExists(hostX,cveXXXX,vulSoftware,remoteExploit, privEscalation)." means that the software vulSoftware on the host hostX has a privilege escalation vulnerability (privEscalation) that can be attacked remotely (remoteExploit). Note that, the identifier cveXXX is an identifier of the vulnerability.

Also, the fifth line of information shown in FIG. 4, "networkServiceInfo(hostX,vulSoftware,tcp,80,admin)." means that the software vulSoftware is executed with the privilege admin in the host hostX and the communication of the protocol tcp is listened for with the port number 80.

Using the attack graph generation rules shown in FIG. 3 and the input file for graph generation shown in FIG. 4, the attack graph generation system 900 generates an attack graph. FIG. 5 is an explanatory diagram showing an example of an attack graph generated by an attack graph generation system 900.

The nodes numbered 5 to 8 shown in FIG. 5 correspond to the information described in the input file for graph generation. The nodes numbered 2 and 4 shown in FIG. 5 are the nodes corresponding to the attack graph generation rules. The attack graph shown in FIG. 5 may contain nodes corresponding to the attack graph generation rules applied during the generation.

Note that, the node corresponding to the attack graph generation rule is the node for which the rule is satisfied when the logical product of the nodes corresponding to the input edge, which is the edge input to the node is satisfied. For example, the rule of node number 4 (Rule 6) is satisfied when both the condition of node number 5 and the condition of node number 6 are satisfied. When the rule of node number 4 is satisfied, the attack of node number 3 becomes executable.

Also, the nodes numbered 1 and 3 shown in FIG. 5 are the nodes derived by the attack graph generation rule. The nodes derived by the attack graph generation rule are the nodes where the attack becomes executable when the logical sum of the nodes corresponding to the input edges is satisfied.

In the example shown in FIG. 5, there is only one input edge to the nodes numbered 1 and 3. However, in general, the input edges to the nodes derived by the attack graph generation rule are multiple. When there are multiple input edges, if any one condition of the input source is satisfied, or if any one attack becomes executable, the attack on the node derived by the attack graph generation rule also becomes executable.

Note that, the relationship expressed by the attack graph may be represented by a combination of edges and "AND" or "OR" information added to the edges as shown in FIG. 1, or expressed by nodes indicating the relationship as shown in FIG. 5.

Figure 6:
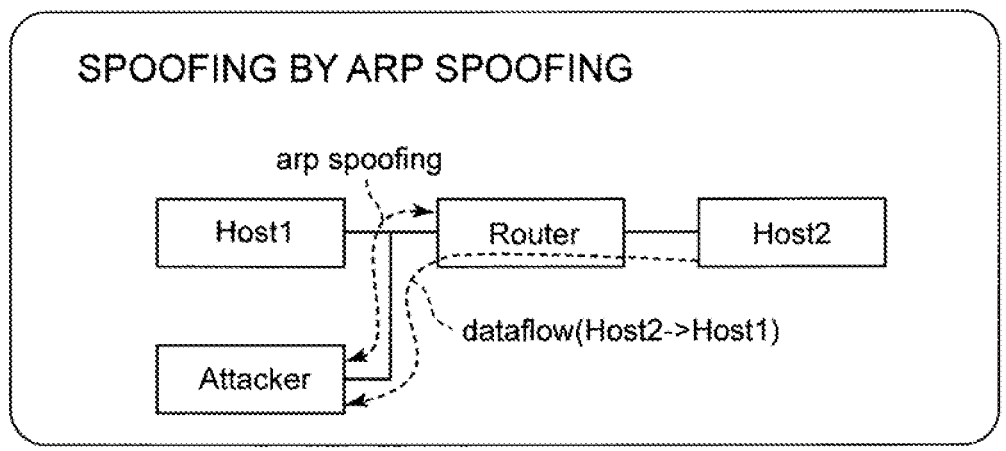
FIG. 6 is an explanatory diagram showing an example of spoofing by Arp spoofing.

FIG. 6 is an explanatory diagram showing an example of spoofing by Arp spoofing. The Attacker shown in FIG. 6 spoofs a communication device on a Local Area Network (LAN) by disguising the response of the address resolution protocol (Arp). Specifically, the Attacker performs Arp spoofing on the Router and then receives a dataflow sent from Host2 to Host1.

The number of nodes in an automatically generated attack graph tends to be larger than the case where the attack graph is generated manually. For example, security administrators who write their own attack graphs may generate attack graphs by omitting conditions that are not involved in the essential content of the attack.

However, when the attack graph is generated automatically, all the necessary conditions for generating the attack graph are taken into account. Therefore, the number of nodes in the attack graph tends to increase compared to the case where the attack graph is generated manually. The increase in the number of nodes reduces the visibility of the attack graph.

For the above reasons, even with the degree of attack shown in FIG. 6, an automatically generated attack graph may contain as many as 100 nodes. Hereinafter, an attack graph processing device that can improve the visibility of attack graphs containing a large number of nodes is described.

Example Embodiment 1

Figure 7:
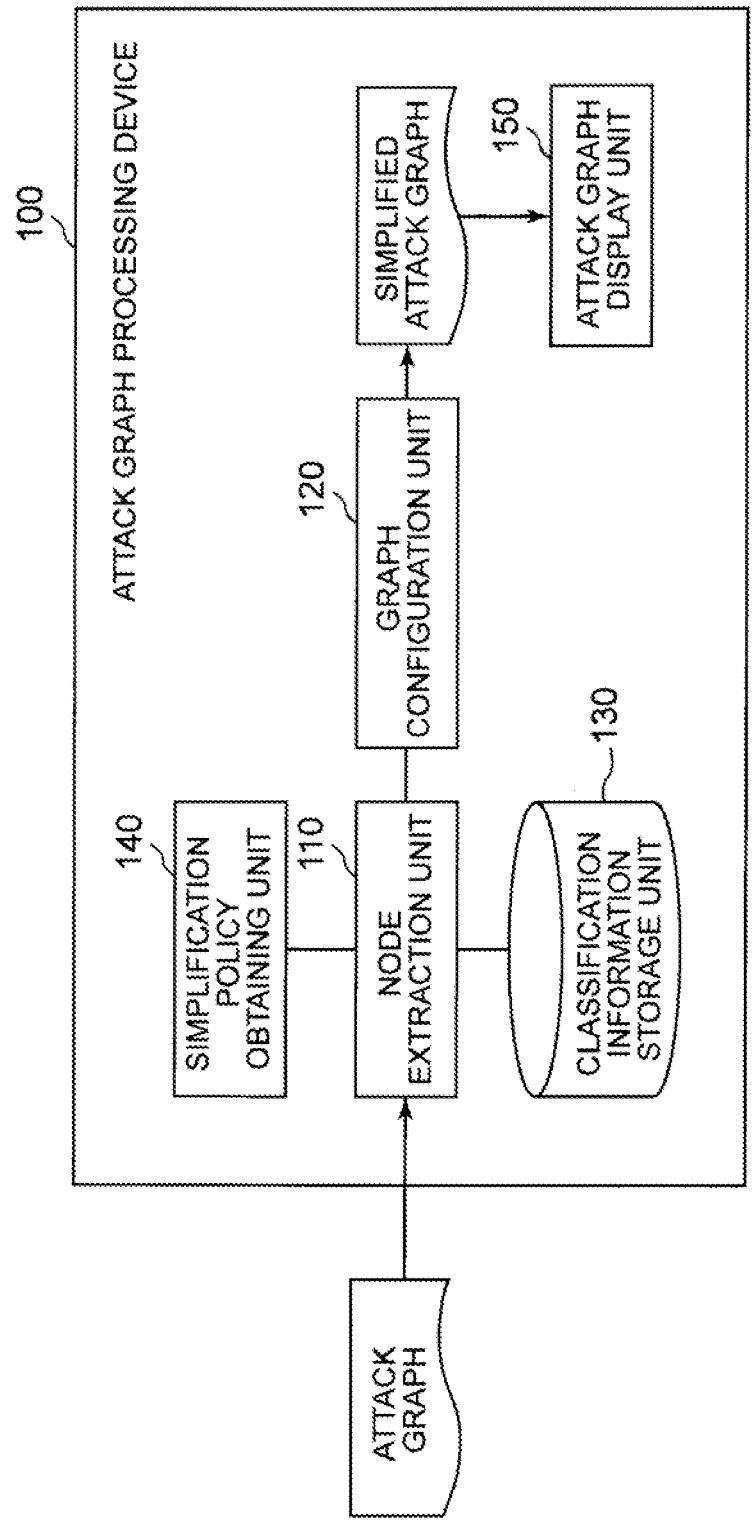
FIG. 7 is a block diagram showing an example of the configuration of an attack graph processing device of the first example embodiment of the present invention.

FIG. 7 is a block diagram showing an example of the configuration of an attack graph processing device of the first example embodiment of the present invention. The attack graph processing device 100 of the first example embodiment includes a node extraction unit 110, a graph configuration unit 120, a classification information storage unit 130, a simplification policy obtaining unit 140, and an attack graph display unit 150.

The attack graph processing device 100 of the present example embodiment simplifies the attack graph by extracting nodes in the attack graph on the basis of the classification information of the attack graph generation rules.

The classification information in the present example embodiment indicates the attack graph generation rules classified into a predetermined group. In other words, one group indicated by the classification information corresponds to one criterion by which the attack graph generation rules are classified.

The node extraction unit 110 has a function of extracting nodes from the input attack graph using the classification information specified by the simplification policy. Note that, the simplification policy is information that indicates the classification information used to simplify the attack graph.

The graph configuration unit 120 has a function of configuring a simplified attack graph on the basis of the nodes extracted by the node extraction unit 110.

The classification information storage unit 130 has a function of storing each classification information corresponding to each of the plurality of attack graph generation rules.

The simplification policy obtaining unit 140 is an input interface for obtaining the simplification policy. The simplification policy obtaining unit 140 does not have to be included in the attack graph processing device 100.

The attack graph display unit 150 is an output interface that displays the simplified attack graph. The attack graph display unit 150 does not have to be included in the attack graph processing device 100. For example, the attack graph display unit 150 may be located remotely to the attack graph processing device 100.

There are several possible criteria by which attack graph generation rules may be classified. For example, an attack graph generation rule may be classified according to the content of the rule, i.e., according to what the rule itself represents. When attack graph generation rules are classified according to the content of the rules, the classification information indicates a group of rules related to the behavior of the primary agent of the attack, a group of rules representing the relationship of the system, and so on.

Also, the attack graph generation rules may be classified according to the nodes derived from the rules. When the attack graph generation rules are classified according to the nodes derived from the rules, the classification information indicates a group of rules that derive the nodes indicating the state of the primary agent of an attack, a group of rules that derive the nodes indicating the state of the host or the communication network, and so on. Note that, a single attack graph generation rule may be classified into two or more groups.

FIG. 8 is an explanatory diagram showing another example of an attack graph generation rule. The attack "execCode3(Principal, Host, admin):-" in the first line shown in FIG. 8 means that Principal, the primary agent of the attack, can execute arbitrary code with administrator privilege on the host Host.

Also, the precondition "localAccess3(Principal, Host, User)," in the second line shown in FIG. 8 means that Principal, the primary agent of the attack, can log in to the host Host with the privilege of the user account User. Also, the precondition "localService3(Host, Prog, User)," in the third line shown in FIG. 8, means that the program Prog runs on the host Host with the privilege of the user account User.

Also, the precondition "vulSoftware5(Host,_vulID, Prog, localEploit, privEsc)," in the fourth line shown in FIG. 8, means that the program Prog has a privilege escalation vulnerability that can be exploited (Exploit of vulnerability) locally. Note that, the localExploit is a label indicating that being attackable locally. Also, the privEsc is a label indicating the existence of a privilege escalation vulnerability.

In addition, the precondition "malicious1(Principal)" in the fifth line shown in FIG. 8 means that Principal has malicious intent (Principal is the primary agent of the attack).

Note that, "malicious1(Principal)" shown in FIG. 8 is an example of a predicate that indicates that the primary agent represented by the label or identifier corresponding to the Principal part has the malicious intention. When all the preconditions in lines 2 to 5 shown in FIG. 8 are satisfied, the attack (execCode3) in the first line shown in FIG. 8 can be executed.

The attack graph generation rule shown in FIG. 8 is a rule that indicates the conditions under which an attack that exploits the privilege escalation vulnerability becomes executable. Therefore, the attack graph generation rule shown in FIG. 8 is included in the group of rules related to the behavior of the primary agent of the attack.

Also, the attack graph generation rule shown in FIG. 8 may be included in a group of rules that derive nodes that indicate the state of the primary agent of the attack, or a group of rules that derive nodes related to a host.

FIG. 9 is an explanatory diagram showing another example of an attack graph generation rule. The condition "l2Connection5(SrcHost, DstHost, Subnet, Prot, ipSubnet):-" in the first line shown in FIG. 9 means that the host SrcHost and the host DstHost are connected at the data link layer in the OSI reference model.

The precondition "located3(SrcHost, Subnet, ipSubnet)," in the second line shown in FIG. 9, means that the host SrcHost exists in the subnet Subnet. Also, the precondition "located3(DstHost, Subnet, ipSubnet)" in the third line shown in FIG. 9 means that the host DstHost exists in the subnet Subnet. When all preconditions in the second to third lines shown in FIG. 9 are satisfied, the condition in the first line shown in FIG. 9 is satisfied.

The attack graph generation rule shown in FIG. 9 is a rule that represents that the nodes in the same subnet are connected in the data link layer. Therefore, the attack graph generation rule shown in FIG. 9 is included in the group of rules that represent system relationships.

The attack graph generation rule shown in FIG. 9 may be included in a group of rules that derive nodes that indicate the state of a communication network. Note that, each argument of the predicates shown in FIGS. 8-9 corresponds to a label or an identifier that represents some entity or parameter. By assigning labels or identifiers to those arguments, each predicate can express a state related to a concrete entity.

Hereinafter, an operation example of the node extraction unit 110 is described. First, the node extraction unit 110 determines the classification information to be used for simplifying the attack graph. That is, the node extraction unit 110 determines a group in which the attack graph generation rule related to the nodes to be extracted is classified according to a simplification policy input by an administrator or the like.

The node extraction unit 110 selects one or more of the classification information among the classification information stored in the classification information storage unit 130. For example, when three types of classification information are stored in the classification information storage unit 130, namely, the classification information indicating a rule classified into Group A, the classification information indicating a rule classified into Group B, and the classification information indicating a rule classified into Group C, the node extraction unit 110 selects one or more classification information among Groups A to C.

Next, the node extraction unit 110 extracts nodes from the attack graph that are related to the attack graph generation rule indicated by the selected classification information. The extracted nodes are one or more of the nodes that correspond to the attack graph generation rule itself, the nodes that are preconditions for the attack graph generation rule, and the nodes that are derived by the attack graph generation rule.

Also, when the attack graph includes an identifier of the attack graph generation rule, the node extraction unit 110 determines whether each node is related to the attack graph generation rule indicated by the selected classification information on the basis of the identifier and the classification information, respectively. When the identifier is included, one or more sets of the classification information and the identifier of the rule are stored in the classification information storage unit 130.

Also, when the attack graph does not include an identifier of the attack graph generation rule, the node extraction unit 110 determines, for example, whether each node is related to the attack graph generation rule indicated by the classification information selected from the combination of the information of the input and output edges of each node, respectively.

When the identifier is not included, the classification information storage unit 130 stores one or more sets of the information of the information type included in the input edge node, the information of the information type included in the output edge, and the classification information. The information of the information type indicates communication network-related identification information such as an IP (Internet Protocol) address, a software name, a vulnerability number, and the like.

Figure 10:
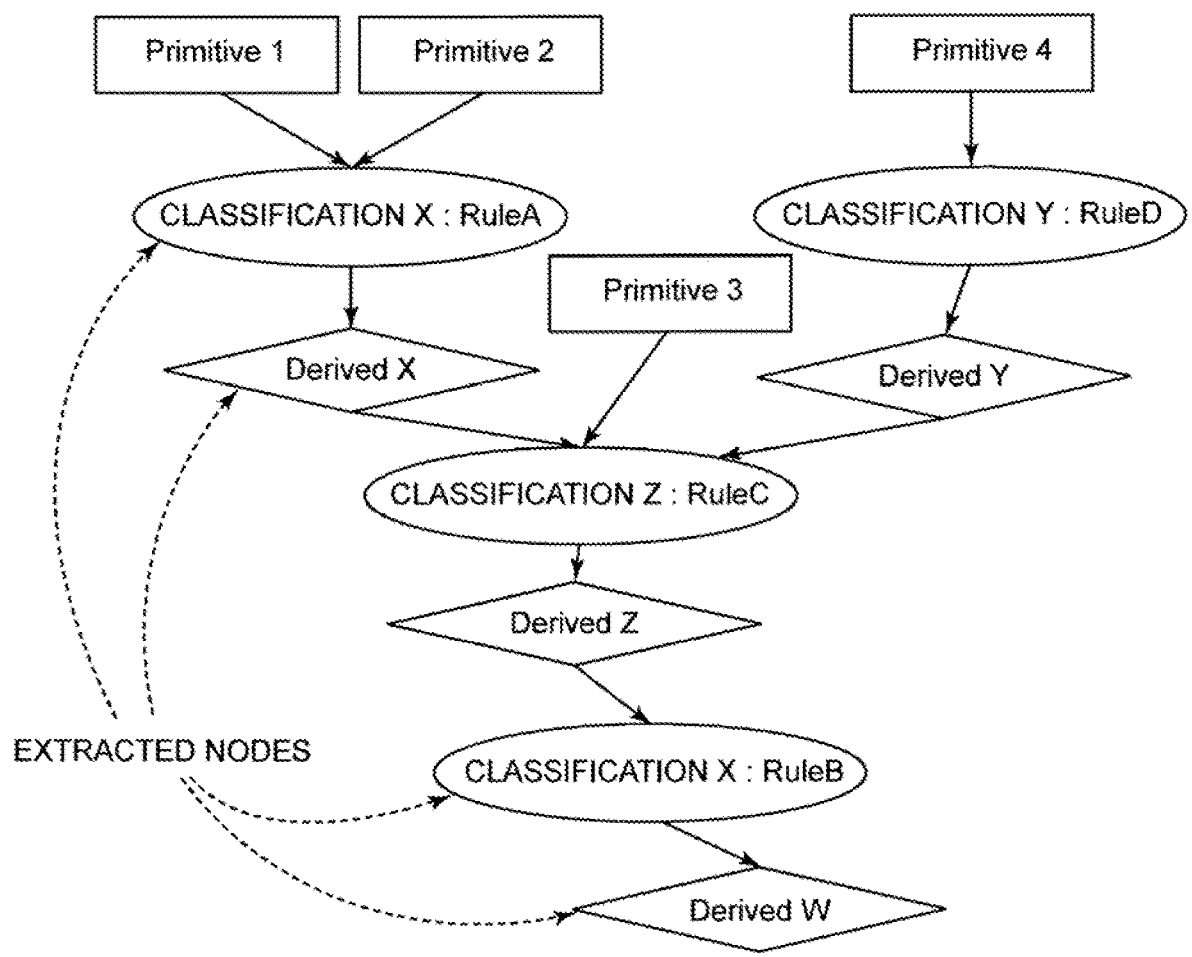
FIG. 10 is an explanatory diagram showing an example of an attack graph and the nodes extracted from the attack graph.

FIG. 10 is an explanatory diagram showing an example of an attack graph and the nodes extracted from the attack graph. In the example shown in FIG. 10, the nodes ("Classification X:RuleA" and "Classification X:RuleB") corresponding to the attack graph generation rule itself classified in the group "Classification X" and the nodes ("Derived X" and "Derived W") derived by the attack graph generation rule are the nodes to be extracted.

Hereinafter, the operation example of the graph configuration unit 120 is described. The graph configuration unit 120 deletes the nodes that were not extracted by the node extraction unit 110 while maintaining the logical structure of the attack graph. Note that "maintaining the logical structure of the attack graph" means that the relationship between the nodes indicated by the attack graph do not change before and after the nodes are deleted. The relationship between nodes is a relationship that represents a logical relationship such as "AND" or "OR".

Figure 11:
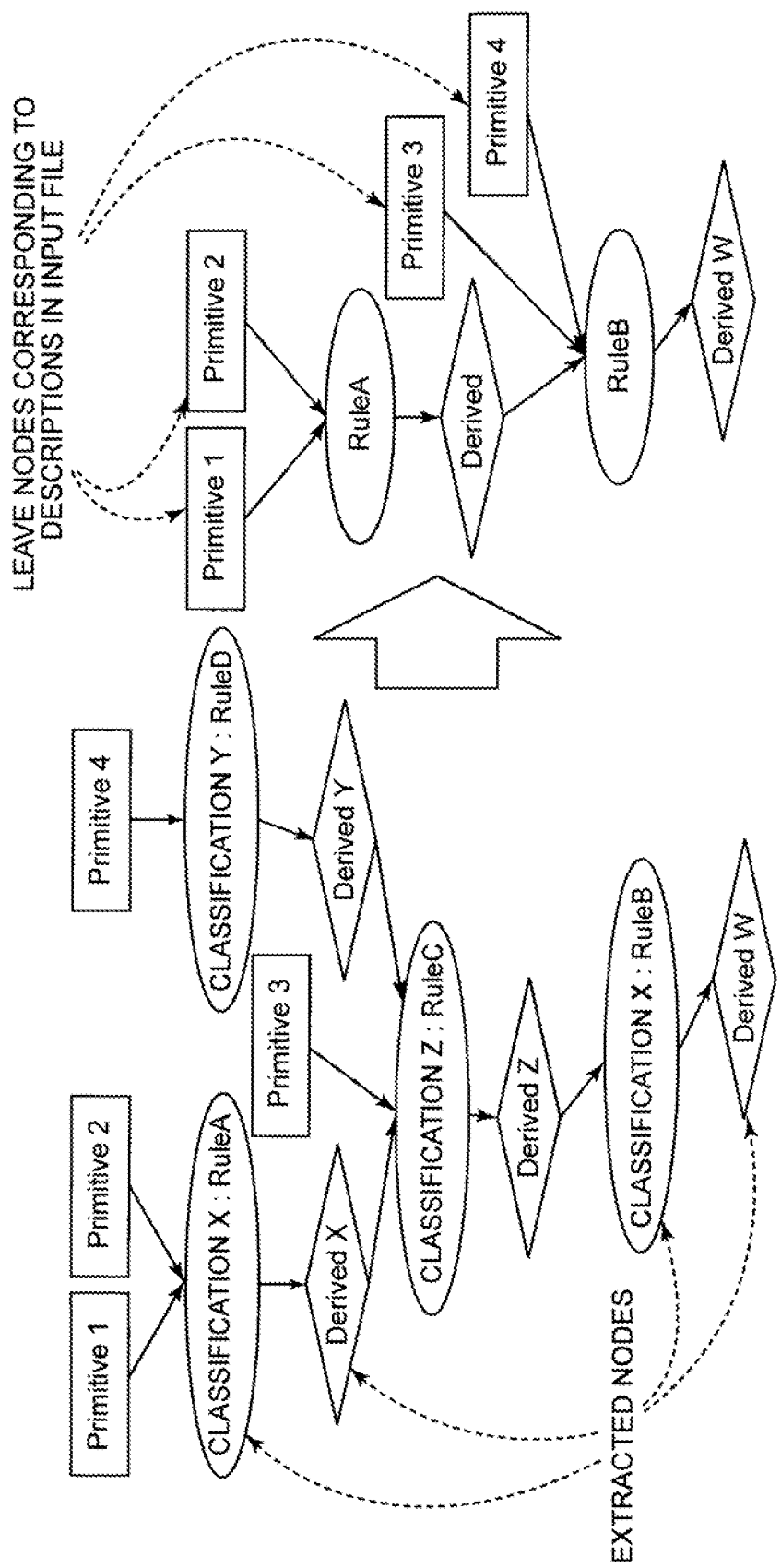
FIG. 11 is an explanatory diagram showing an example of simplifying an attack graph by a graph configuration unit 120.

For example, the graph configuration unit 120 leaves only certain nodes related to rules related to the behavior of the primary agent of the attack, and deletes other nodes. FIG. 11 is an explanatory diagram showing an example of simplifying an attack graph by the graph configuration unit 120. The contents shown in the left of FIG. 11 are the same as the attack graph and the nodes extracted from the attack graph shown in FIG. 10.

As shown in the right of FIG. 11, the graph configuration unit 120 deletes the nodes that were not extracted by the node extraction unit 110. As shown in the right of FIG. 11, the graph configuration unit 120 leaves the nodes corresponding to the descriptions in the input file for graph generation in the attack graph.

A method of deleting the nodes which have not been extracted by the graph configuration unit 120 while maintaining the logical configuration of the attack graph will be described with reference to FIGS. 12-14.

First, the graph configuration unit 120 extracts nodes other than those extracted by the node extraction unit 110 as nodes to be attempted to be deleted.

Next, the graph configuration unit 120 modifies the attack graph as shown in FIGS. 12-14, respectively, with respect to node R, the node that is to be attempted to be deleted.

Specifically, the graph configuration unit 120 tags the nodes that it first attempts to delete. Next, the graph configuration unit 120 deletes the nodes whose deletion does not affect the "AND" structure and the "OR" structure of the attack graph. If the logical structure of the "AND" or "OR" is affected at each stage, the graph configuration unit 120 suspends deletion of the node that it attempts to delete.

When all the deleteable nodes have been deleted from the attack graph, the graph configuration unit 120 ends the deletion process.

FIG. 12 is an explanatory diagram showing an example of a process of deleting a node by the graph configuration unit 120. "AND R" shown in FIG. 12 is an "AND" node that the graph configuration unit 120 attempts to delete. "AND R" corresponds to the node that be tagged that attempting to delete as described above.

In addition, "Node A" and "Node B" shown in FIG. 12 are arbitrary nodes. Also, "OR C" shown in FIG. 12 is an arbitrary "OR" node. Note that, an "AND" node is a node whose input edges have an "AND" relationship. Also, an "OR" node is a node whose input edges have an "OR" relationship.

As shown in the upper of FIG. 12, when there is one input edge to "AND R", the graph configuration unit 120 deletes "AND R" and connects the input edge to "AND R" to the child node of "AND R".

Also, as shown in the lower of FIG. 12, when there are multiple input edges to "AND R" and the child node of "AND R" is "OR" node, the graph configuration unit 120 suspends the processing of "AND R". "AND R" shown in the lower of FIG. 12 is added the tag "pending". Note that the graph configuration unit 120 does not need to add the tag "pending".

FIG. 13 is an explanatory diagram showing another example of a process of deleting a node by the graph configuration unit 120. "OR R" shown in FIG. 13 is an "OR" node that the graph configuration unit 120 attempts to delete. "OR R" corresponds to the node that be tagged that attempting to delete as described above.

In addition, "Node A" and "Node B" shown in FIG. 13 are arbitrary nodes. Also, "AND A" shown in FIG. 13 is an arbitrary "AND" node.

As shown in the upper of FIG. 13, when there is one input edge to "OR R", the graph configuration unit 120 deletes "OR R" and connects the input edge to "OR R" to the child node of "OR R".

Also, as shown in the lower of FIG. 13, when there are multiple input edges to "OR R" and the child node of "OR R" is "OR" node, the graph configuration unit 120 suspends the processing of "OR R". "OR R" shown in the lower of FIG. 13 is added the tag "pending". Note that the graph configuration unit 120 does not need to add the tag "pending".

FIG. 14 is an explanatory diagram showing another example of a process of deleting a node by the graph configuration unit 120. "AND R" shown in FIG. 14 is an "AND" node that the graph configuration unit 120 attempts to delete. Also, "OR R" shown in FIG. 14 is an "OR" node that the graph configuration unit 120 attempts to delete. "AND R" and "OR R" correspond to the tagged nodes as described above.

In addition, "Node A" and "Node B" shown in FIG. 14 are arbitrary nodes. Also, "AND C" shown in FIG. 14 is an arbitrary "AND" node. Also, "OR C" shown in FIG. 14 is an arbitrary "OR" node.

As shown in the upper of FIG. 14, when there is one output edge from "AND R" and the child node to which the output edge is connected is an "AND" node, the graph configuration unit 120 deletes "AND R", and connects the input edge to "AND R" to the child node.

Also, as shown in the lower of FIG. 14, when there is one output edge from "OR R" and the child node to which the output edge is connected is an "OR" node, the graph configuration unit 120 deletes "OR R", and connects the input edge to "OR R" to the child node.

Note that, in the case where the "AND" or "OR" structure is not maintained, the graph configuration unit 120 may simply delete nodes other than the extracted node, or delete only the extracted node and nodes that do not have an input edge.

For example, if a node having no input edges other than "AND R" and "OR R" is extracted as a node to be attempted to be deleted, the graph configuration unit 120 simply delete the extracted node and the output edges from the extracted node.

The input edge to the node to be deleted is replaced by the nearest child node or grandchild node that is not deleted. An input edge to which there is no replacement is deleted. When there are no more nodes that can be deleted among the tagged nodes, the graph configuration unit 120 ends the deletion process.

The graph configuration unit 120 can process an attack graph that includes "AND" nodes and "OR" nodes. In the attack graph shown in FIG. 5, a node corresponding to the attack graph generation rule itself corresponds to an "AND" node, and a node derived by the attack graph generation rule corresponds to an "OR" node, respectively.

Figure 15:
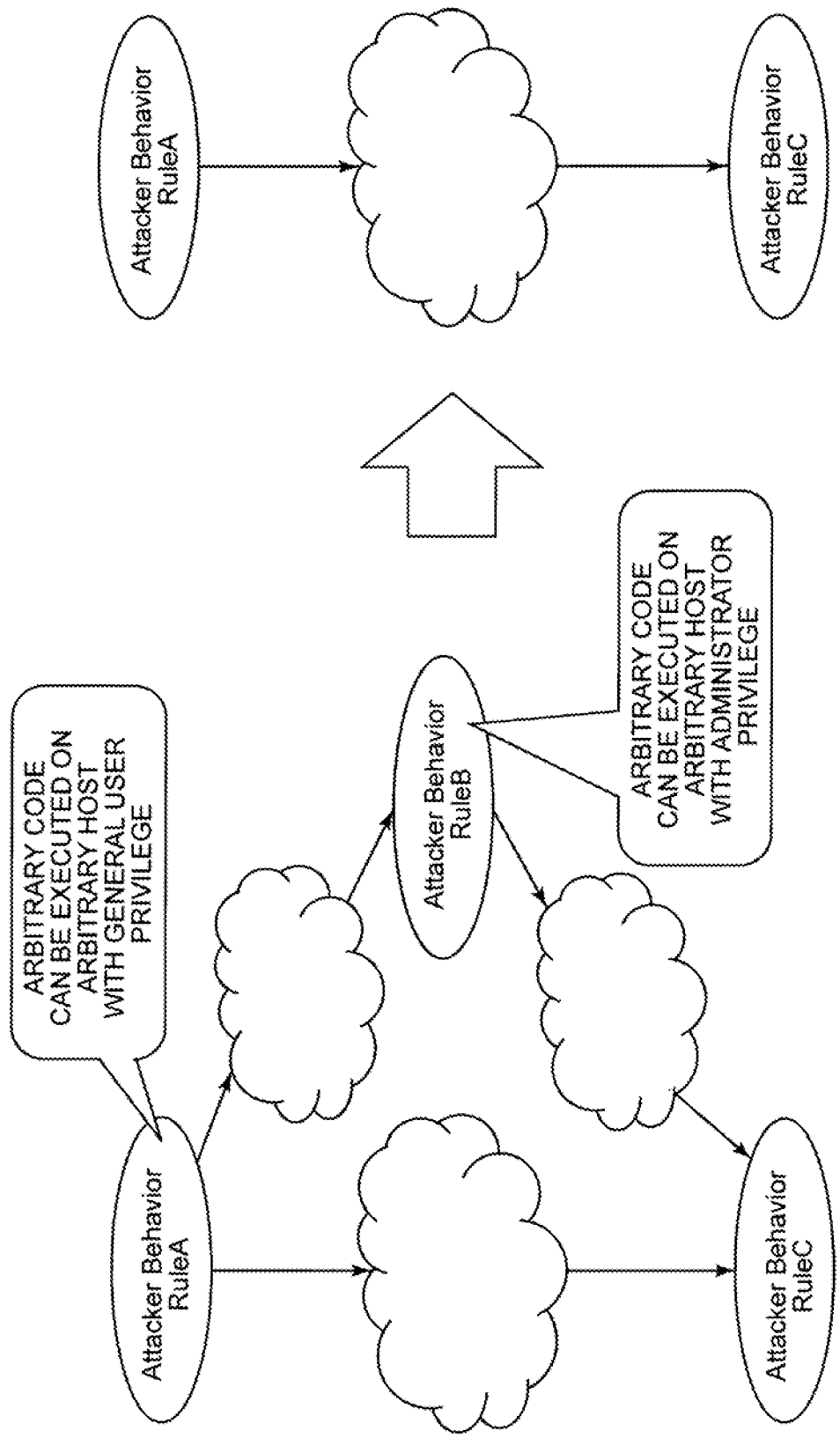
FIG. 15 is an explanatory diagram showing another example of an attack graph and the nodes extracted from the attack graph.

Note that, in the case of extracting the attack graph generation rule for determining whether or not to execute an attack, the node extraction unit 110 can extract the nodes as follows. FIG. 15 is an explanatory diagram showing another example of an attack graph and the nodes extracted from the attack graph.

When an attack path that does not involve another attack graph generation rule and an attack path that involves another attack graph generation rule exist in the middle of an attack path from any attack graph generation rule to other attack graph generation rule, the node extraction unit 110 can exclude nodes related to another attack graph generation rule from the nodes to be extracted.

"Attacker Behavior RuleA" shown in FIG. 15 is a node corresponding to the attack graph generation rule for determining whether or not arbitrary code can be executed with general user privilege on an arbitrary Host. Also, "Attacker Behavior RuleB" is a node corresponding to the attack graph generation rule for determining whether or not arbitrary code can be executed with administrator privilege on an arbitrary Host. In addition, a cloud-shaped figure represents a set of arbitrary nodes.

As shown in the left of FIG. 15, from "Attacker Behavior RuleA" to another node "Attacker Behavior RuleC" corresponding to the attack graph generation rule can be reached through "Attacker Behavior RuleB" or even without "Attacker Behavior RuleB".

Therefore, in the example shown in FIG. 15, the node extraction unit 110 can exclude the nodes related to the attack graph generation rule "Attacker Behavior RuleB" from the nodes to be extracted. As shown in the right of FIG. 15, the graph configuration unit 120 deletes the node representing the attack graph generation rule "Attacker Behavior RuleB" and the related nodes from the attack graph.

Description of Operation

Figure 16:
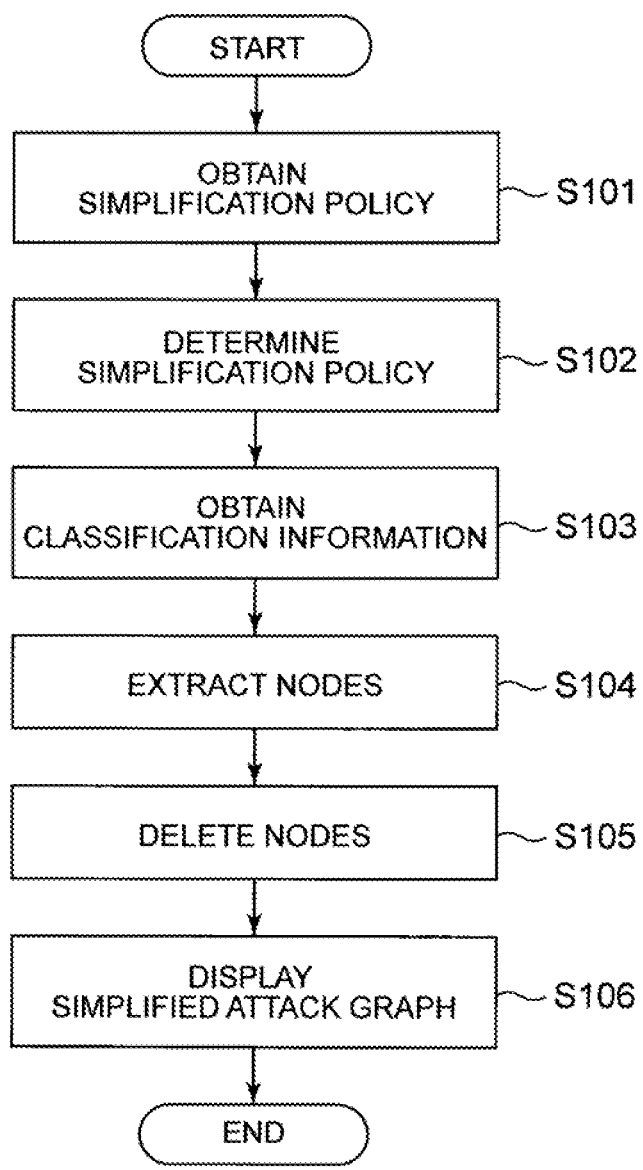
FIG. 16 is a flowchart showing an operation of an attack graph processing by an attack graph processing device 100 of the first example embodiment.

Hereinafter, the operation of processing the attack graph of the attack graph processing device 100 of this example embodiment will be described with reference to FIG. 16. FIG. 16 is a flowchart showing an operation of an attack graph processing by the attack graph processing device 100 of the first example embodiment.

First, the simplification policy obtaining unit 140 obtains a simplification policy (step S101).

Next, the simplification policy obtaining unit 140 inputs the input simplification policy to the node extraction unit 110. The node extraction unit 110 determines the input simplification policy as the simplification policy to be used (step S102). Note that, the processing before the determination of the simplification policy may be omitted.

Next, the node extraction unit 110 obtains the classification information specified by the determined simplification policy from the classification information storage unit 130 (step S103).

Next, the node extraction unit 110 extracts from the input attack graph the nodes related to the attack graph generation rules that are classified into the group indicated by the obtained classification information (step S104). The node extraction unit 110 inputs the extracted nodes and the original attack graph to the graph configuration unit 120.

Next, the graph configuration unit 120 deletes the nodes that were not extracted by the node extraction unit 110 from the input attack graph (step S105). The graph configuration unit 120 inputs the attack graph from which the nodes have been deleted to the attack graph display unit 150 as a simplified attack graph.

Next, the attack graph display unit 150 displays the input simplified attack graph to the security administrator (step S106). Note that, the processing after the deletion of the nodes may be omitted. After the display, the attack graph processing device 100 ends the attack graph processing process.

Description of Effect

The node extraction unit 110 of the attack graph processing device 100 of this example embodiment extracts nodes from the attack graph on the basis of the classification information. In other words, the attack graph processing device 100 can improve the visibility of the attack graph and prevent information on arbitrary criteria from being lost from the attack graph. Therefore, the attack graph processing device 100 can easily analyze the attacks in the system to be diagnosed.

When using attack graphs, the security administrator may obtain information based on any one of the following criteria: "what actions the primary agent of the attack will take to achieve the objective", "what are the conditions of each attack", and "which hosts will be used in the attack", and so on.

In the case where the security administrator wants to obtain information based on the criterion of "what actions the primary agent of the attack will take," the node extraction unit 110 uses classification information indicating a group of rules related to the behavior of the primary agent of the attack. In order to extract the nodes related to the rules related to the behavior of the primary agent of the attack, the node extraction unit 110 can improve the visibility of the attack graph after reducing the number of nodes without losing the information that the security administrator wants to obtain.

Using the attack graph with improved visibility, the security administrator can easily grasp "what actions the primary agent of the attack will take to achieve the objective". In other words, the security administrator can easily grasp the information about the criteria corresponding the classification information by the simplified attack graph using the classification information.

Example Embodiment 2

Figure 17:
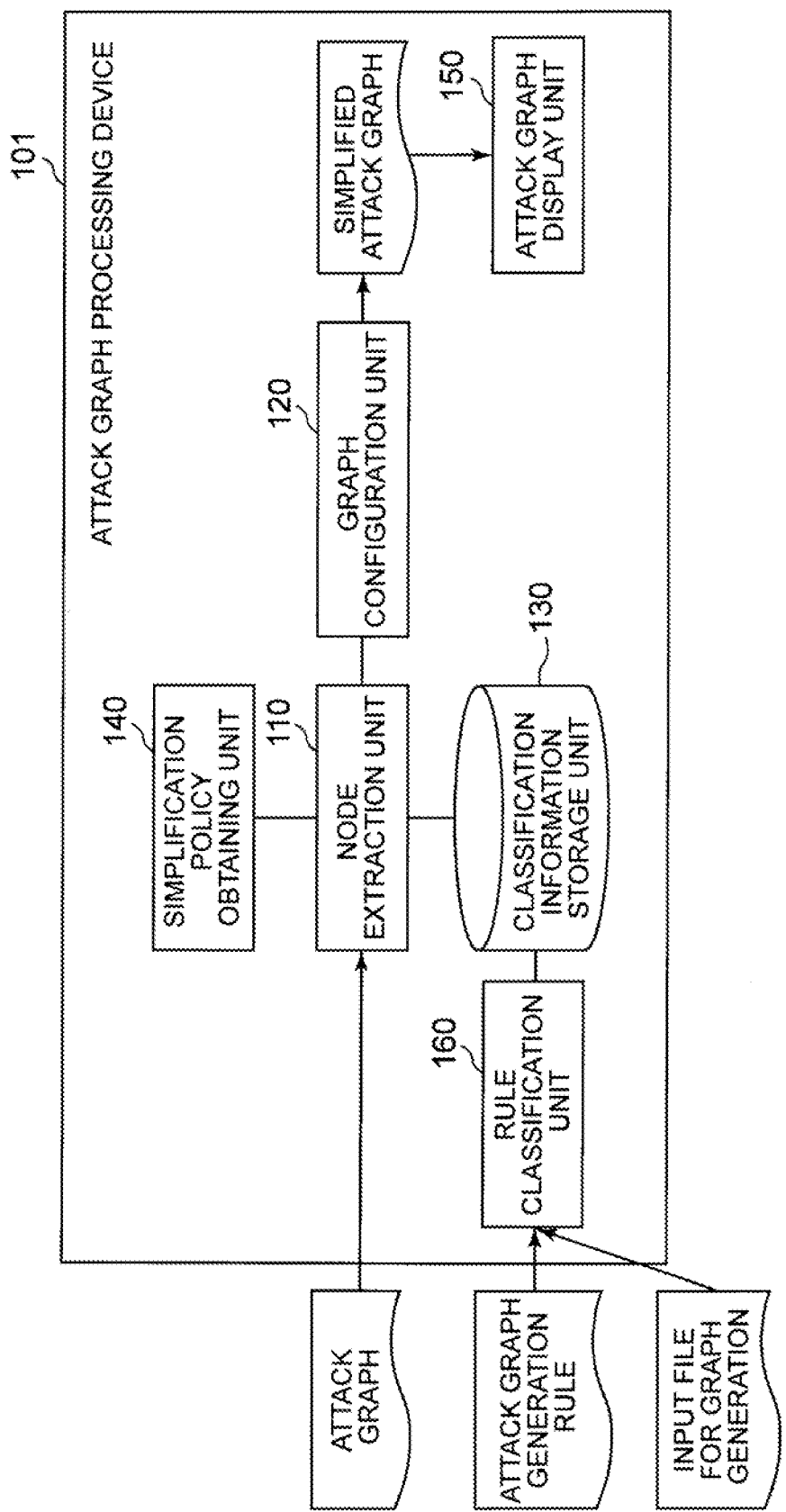
FIG. 17 is a block diagram showing an example of the configuration of an attack graph processing device of the second example embodiment of the present invention.

FIG. 17 is a block diagram showing an example of the configuration of an attack graph processing device of the second example embodiment of the present invention. The attack graph processing device 101 of the second example embodiment includes the node extraction unit 110, the graph configuration unit 120, the classification information storage unit 130, the simplification policy obtaining unit 140, the attack graph display unit 150, and a rule classification unit 160.

The configuration of the attack graph processing device 101, other than the rule classification unit 160 in this example embodiment, is similar to the configuration of the attack graph processing device 100 of the first example embodiment shown in FIG. 7.

The rule classification unit 160 has a function of generating classification information indicating attack graph generation rules classified into predetermined group. The rule classification unit 160 generates the classification information on the basis of the attack graph generation rules and the input file for graph generation. To generate the classification information, the rule classification unit 160 classifies one or more attack graph generation rules into groups, respectively, based on various criteria.

Note that, the attack graph generation rules and the input file for graph generation input to the rule classification unit 160 are basically the data used to generate the attack graph input to the node extraction unit 110, but may be data other than the data used to generate the attack graph.

Hereinafter, the example in which the rule classification unit 160 classifies the attack graph generation rules will be described with reference to the attack graph generation rules shown in FIGS. 8-9. For example, when classifying the attack graph generation rules according to the content of the rules, the rule classification unit 160 classifies the rules on the basis of the type of predicate, which is a predicate object included in the preconditions of the rules, and information of arguments of the predicate.

For example, if a predicate with an argument corresponding to a Common Vulnerabilities and Exposures (CVE) number or the like is present in the condition, the rule classification unit 160 classifies the attack graph generation rules into a group of rules related to the behavior of the primary agent of the attack.

It is confirmed from the input file for graph generation that the CVE number, which is information indicating the identifier of the vulnerability, is placed in the "_vulID" portion in the fourth line of the attack graph generation rule shown in FIG. 8. Therefore, the rule classification unit 160 classifies the attack graph generation rule shown in FIG. 8 into a group of rules related to the behavior of the primary agent of the attack.

Also, as shown in the fifth line of the attack graph generation rule shown in FIG. 8, if there is a predicate in the condition indicating that a particular primary agent is the primary agent of the attack, the rule classification unit 160 classifies the attack graph generation rules into a group of rules related to the behavior of the primary agent of the attack.

When classifying the attack graph generation rules according to the nodes derived from the rules, the rule classification unit 160 classifies the rules on the basis of the information of the type of predicate and the arguments of the predicate derived by the rules.

For example, if it is confirmed from the input file for graph generation that a predicate including a label or identifier indicating a primary agent of an attack such as "Principal" in the first line of the attack graph generation rule shown in FIG. 8 is derived, the rule classification unit 160 classifies the attack graph generation rule shown in FIG. 8 into a group of rules that derive a node indicating the state of the primary agent of the attack.

Also, for example, if it is confirmed from the input file for graph generation that a communication network-related identifier or label such as "Subnet, Prot, ipSubnet" in the first line of the attack graph generation rule shown in FIG. 9 is contained, the rule classification unit 160 classifies the attack graph generation rule shown in FIG. 9 into a group of rules that derive nodes indicating the status of hosts and communication networks. The identifiers related to communication network are, for example, IP addresses and MAC (Media Access Control) addresses.

Description of Operation

Figure 18:
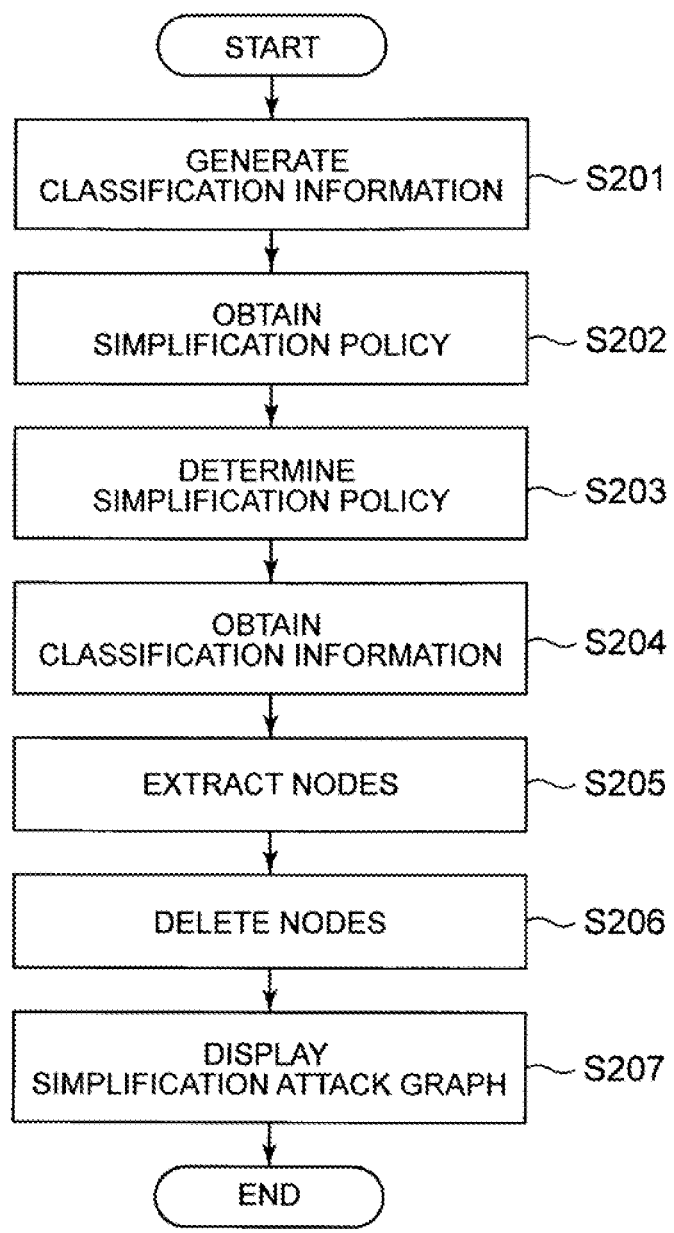
FIG. 18 is a flowchart showing an operation of an attack graph processing by an attack graph processing device 101 of the second example embodiment.

Hereinafter, the operation of processing the attack graph of the attack graph processing device 101 of this example embodiment will be described with reference to FIG. 18. FIG. 18 is a flowchart showing an operation of an attack graph processing by the attack graph processing device 101 of the second example embodiment.

First, an attack graph generation rule and an input file for graph generation are input to the rule classification unit 160. The rule classification unit 160 classifies the input attack graph generation rule on the basis of the input input file for graph generation.

The rule classification unit 160 generates classification information indicating a group including the classified attack graph generation rule (step S201). After generating the classification information, the rule classification unit 160 stores the generated classification information in the classification information storage unit 130.

Each processing of steps S202 to S207 is the same as each processing of steps S101 to S106 shown in FIG. 16, respectively.

Note that, instead of generating the classification information, the rule classification unit 160 may update the content of the classification information already stored in the classification information storage unit 130.

Description of Effect

The rule classification unit 160 in this example embodiment generates classification information on the basis of the attack graph generation rules used to generate the attack graph. Therefore, the node extraction unit 110 using the classification information generated by the rule classification unit 160 can reliably extract nodes from the attack graph. In other words, the attack graph processing device 101 of this example embodiment can simplify the attack graph more efficiently.

Example Embodiment 3

Figure 19:
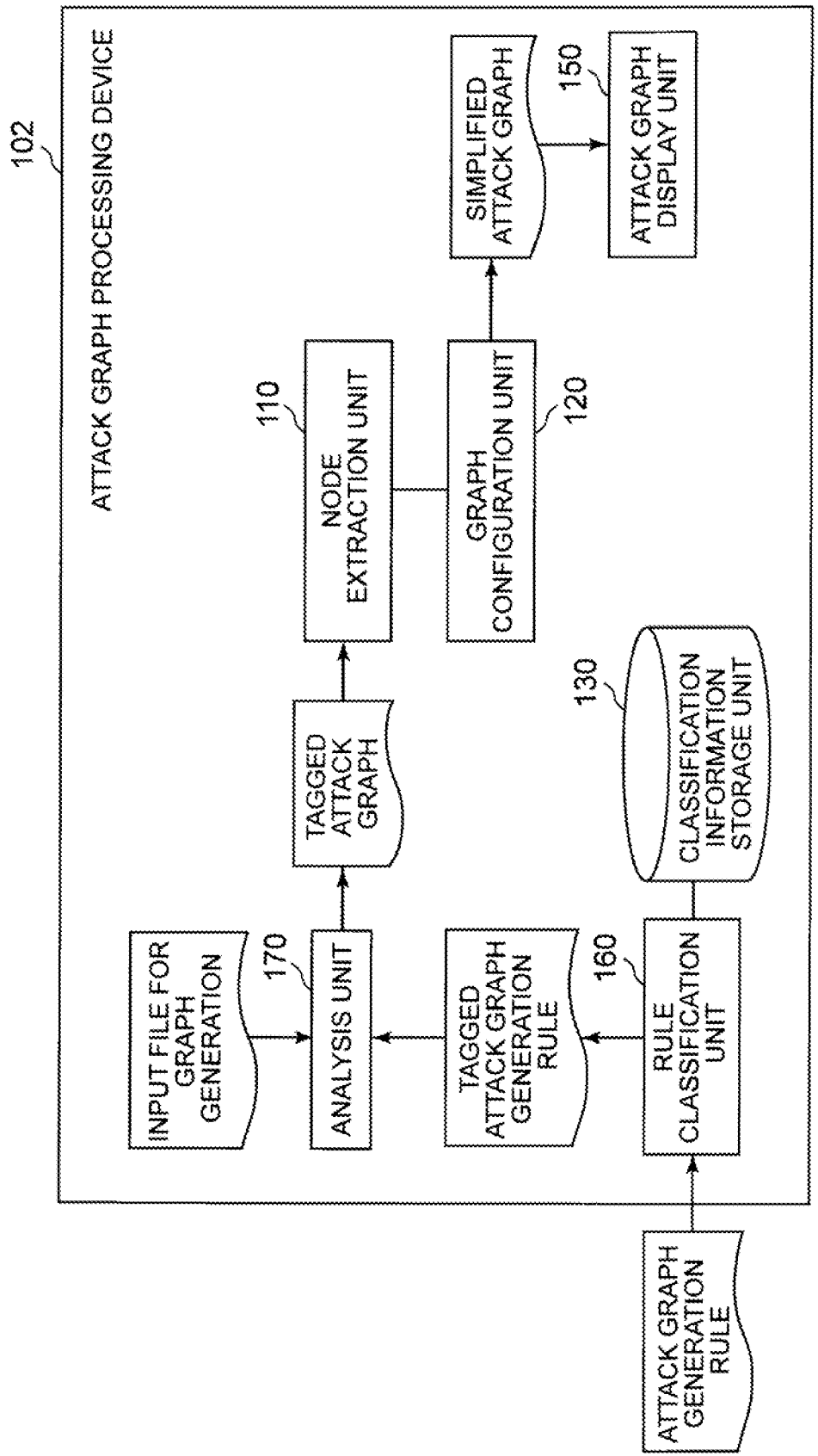
FIG. 19 is a block diagram showing an example of the configuration of an attack graph processing device of the third example embodiment of the present invention.

FIG. 19 is a block diagram showing an example of the configuration of an attack graph processing device of the third example embodiment of the present invention. The attack graph processing device 102 of the third example embodiment includes the node extraction unit 110, the graph configuration unit 120, the classification information storage unit 130, the attack graph display unit 150, the rule classification unit 160, and an analysis unit 170.

The configuration of the attack graph processing device 102, other than the rule classification unit 160 and the analysis unit 170 in this example embodiment, is similar to the configuration of the attack graph processing device 100 of the first example embodiment shown in FIG. 7.

The rule classification unit 160 attaches the classification information stored in the classification information storage unit 130 as tags in advance to each of the input attack graph generation rules. In other words, the tagged attack graph generation rules include information indicating the group into which the rules are classified.

Note that, the rule classification unit 160 attaches the classification information indicating the group determined by a method similar to the method for determining the group into which the attack graph generation rules are classified in the second example embodiment to the attack graph generation rule.

The analysis unit 170 generates a tagged attack graph, which is an attack graph to which classification information is attached, using the input file for graph generation and the tagged attack graph generation rules. The tagged attack graph includes information indicating a group to which each node is related.

The node extraction unit 110 extracts nodes on the basis of the classification information attached to the tagged attack graph, which indicates the group into which the attack graph generation rule has been classified.

Figure 20:
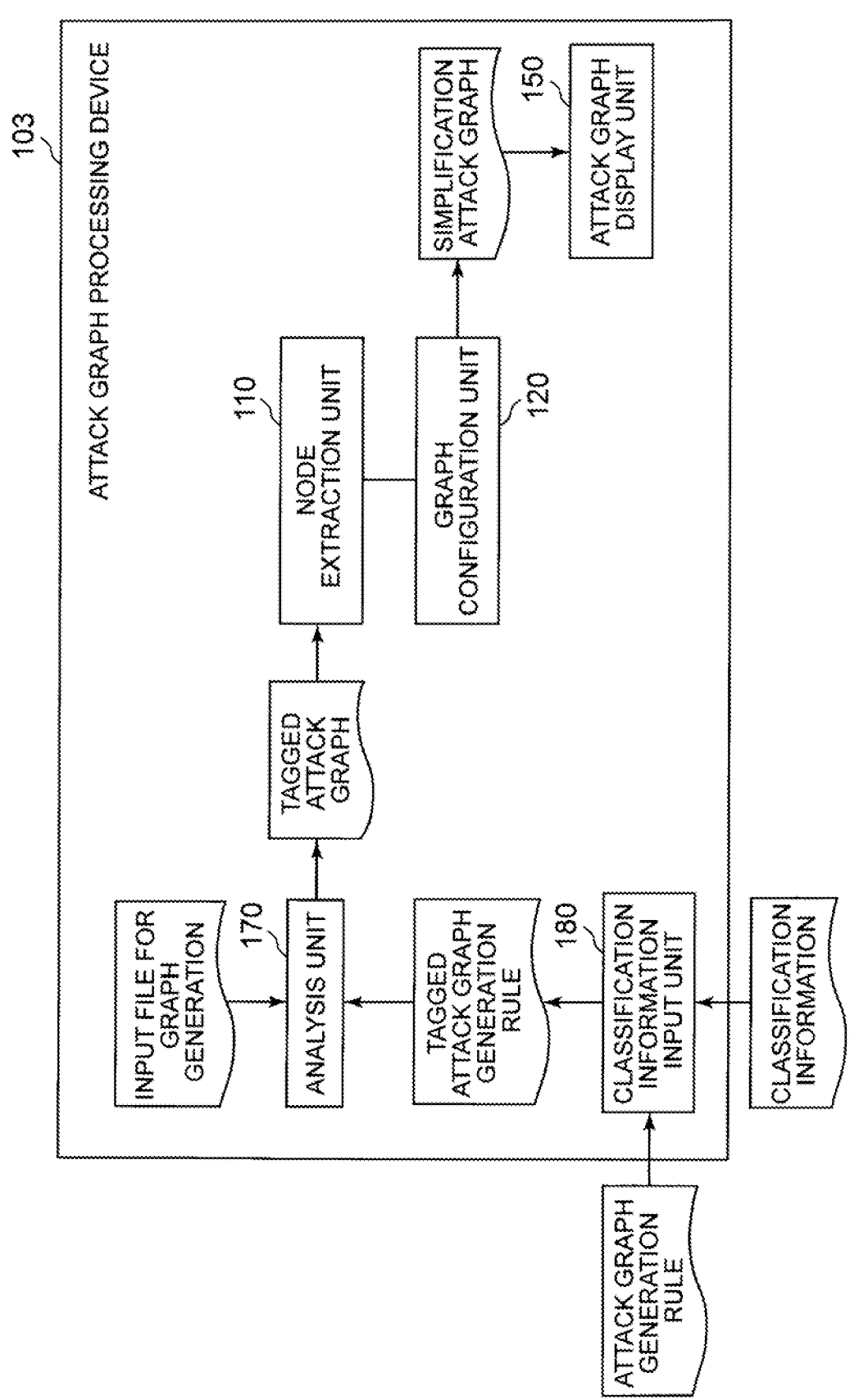
FIG. 20 is a block diagram showing another example of the configuration of an attack graph processing device of the third example embodiment of the present invention.

Note that, the attack graph processing device 102 may include a classification information input unit 180 instead of the classification information storage unit 130 and the rule classification unit 160. FIG. 20 is a block diagram showing another example of the configuration of an attack graph processing device of the third example embodiment of the present invention.

The attack graph processing device 103 of the third example embodiment includes the node extraction unit 110, the graph configuration unit 120, the attack graph display unit 150, the analysis unit 170, and the classification information input unit 180. The configuration of the attack graph processing device 103, other than the analysis unit 170 and the classification information input unit 180 in this example embodiment, is similar to the configuration of the attack graph processing device 100 of the first example embodiment shown in FIG. 7.

The classification information input unit 180 attaches the input classification information as tags in advance to each of the input attack graph generation rules. As shown in FIG. 20, the configuration of the attack graph processing device 103 may be such that the classification information input unit 180 inputs the tagged attack graph generation rules to the analysis unit 170 from the beginning.

Description of Operation

Figure 21:
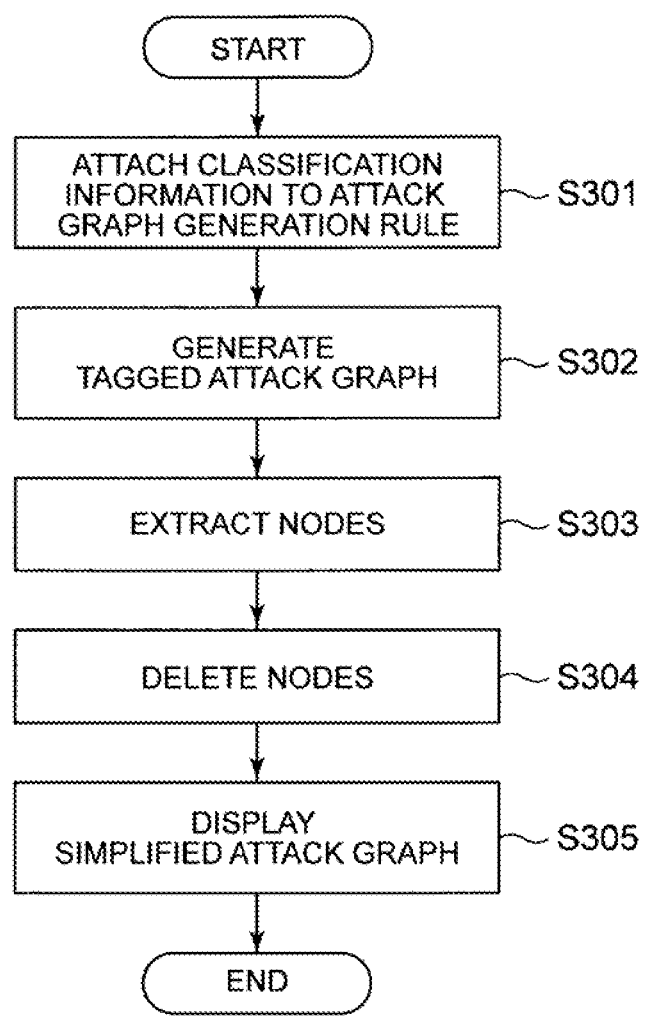
FIG. 21 is a flowchart showing an operation of an attack graph processing by an attack graph processing device 102 of the third example embodiment.

Hereinafter, the operation of processing the attack graph of the attack graph processing device 102 of this example embodiment will be described with reference to FIG. 21. FIG. 21 is a flowchart showing an operation of an attack graph processing by the attack graph processing device 102 of the third example embodiment.

First, the attack graph generation rules are input to the rule classification unit 160. The rule classification unit 160 attaches the classification information stored in the classification information storage unit 130 as tags to each of the input attack graph generation rules, respectively (step S301).

Next, a tagged attack graph generation rule and an input file for graph generation are input to the analysis unit 170. The analysis unit 170 generates a tagged attack graph using the input tagged attack graph generation rules and the input file for graph generation (step S302). The analysis unit 170 inputs the generated tagged attack graph to the node extraction unit 110.

Each processing of steps S303 to S305 is the same as each processing of steps S104 to S106 shown in FIG. 16, respectively.

Note that, when the attack graph processing device 103 shown in FIG. 20 executes the attack graph processing process, in step S301, the classification information input unit 180 attaches the input classification information as tags in advance to each of the input attack graph generation rules, respectively. Each processing of steps S302 to S305 is similar to each of the processing shown in FIG. 21, respectively.

Description of Effect

In the attack graph processing devices 102-103 of this example embodiment, a process in which a tagged attack graph is generated after classification information is attached to an attack graph generation rule and a process in which a simplified attack graph is generated are separated.

Therefore, the attack graph processing devices 102-103 can execute the process of generating a plurality of simplified attack graphs in parallel if a plurality of tagged attack graphs have been generated in advance. In other words, the attack graph processing devices 102-103 can simplify a large number of attack graphs at a high speed.

Note that, the attack graph processing device of each example embodiment may be installed remotely to the system to be diagnosed, or may be installed in a building in which the system to be diagnosed is installed.

Figure 22:
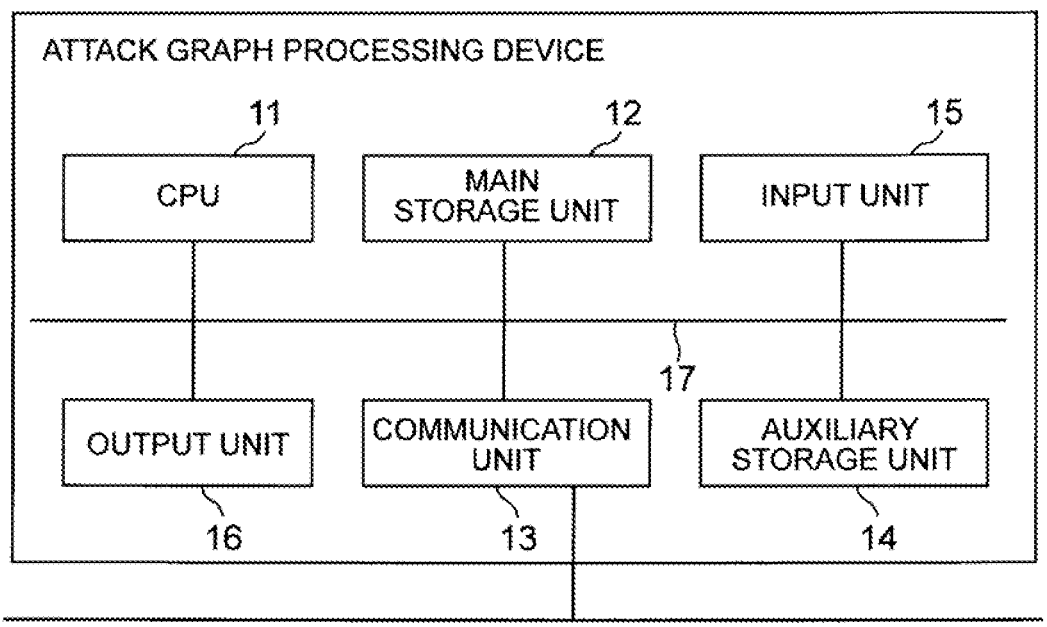
FIG. 22 is an explanatory diagram showing an example of a hardware configuration of an attack graph processing device.

A specific example of a hardware configuration of the attack graph processing device according to each example embodiment will be described below. FIG. 22 is an explanatory diagram showing an example of a hardware configuration of an attack graph processing device.

The attack graph processing device shown in FIG. 22 includes a CPU 11, a main storage unit 12, a communication unit 13, and an auxiliary storage unit 14. The attack graph processing device also includes an input unit 15 for the user to operate and an output unit 16 for presenting a processing result or a progress of the processing contents to the user.

The attack graph processing device is realized by software, as an example, by the CPU 11 shown in FIG. 22 executing a program that provides the functions possessed by each component.

Specifically, each function is realized by software as the CPU 11 loads the program stored in the auxiliary storage unit 14 into the main storage unit 12 and executes it to control the operation of the attack graph processing device.

The attack graph processing device shown in FIG. 22 may include a DSP (Digital Signal Processor) instead of the CPU 11. Alternatively, the attack graph processing device shown in FIG. 22 may include both the CPU 11 and the DSP.

The main storage unit 12 is used as a work area for data and a temporary save area for data. The main storage unit 12 is, for example, RAM (Random Access Memory). The classification information storage unit 130 is realized by the main storage unit 12.

The communication unit 13 has a function of inputting and outputting data to and from peripheral devices through a wired network or a wireless network (information communication network).

The auxiliary storage unit 14 is a non-transitory tangible medium. Examples of non-transitory tangible media are, for example, a magnetic disk, an optical magnetic disk, a CD-ROM (Compact Disk Read Only Memory), a DVD-ROM (Digital Versatile Disk Read Only Memory), a semiconductor memory.

The input unit 15 has a function of inputting data and processing instructions. The input unit 15 is, for example, an input device such as a keyboard or a mouse. The simplification policy obtaining unit 140 and the classification information input unit 180 may be realized by the input unit 15.

The output unit 16 has a function to output data. The output unit 16 is, for example, a display device such as a liquid crystal display device. The attack graph display unit 150 may be realized by the output unit 16.

As shown in FIG. 22, in the attack graph processing device, each component is connected to the system bus 17.

The auxiliary storage unit 14 stores, for example, programs for realizing the node extraction unit 110, the graph configuration unit 120, the rule classification unit 160, and the analysis unit 170.

There are various variations of the realization method of each server described above. For example, each server may be realized by any combination of a separate information processing device and a program for each component. Also, a plurality of components comprised by each device may be realized by any combination of a single information processing device and a program.

Some or all of the components may be realized by a general-purpose circuit (circuitry) or a dedicated circuit, a processor, or a combination of these. They may be configured by a single chip or by multiple chips connected via a bus. Some or all of the components may be realized by a combination of the above-mentioned circuit, etc. and a program.

In the case where some or all of the components are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected via a communication network.

Figure 23:
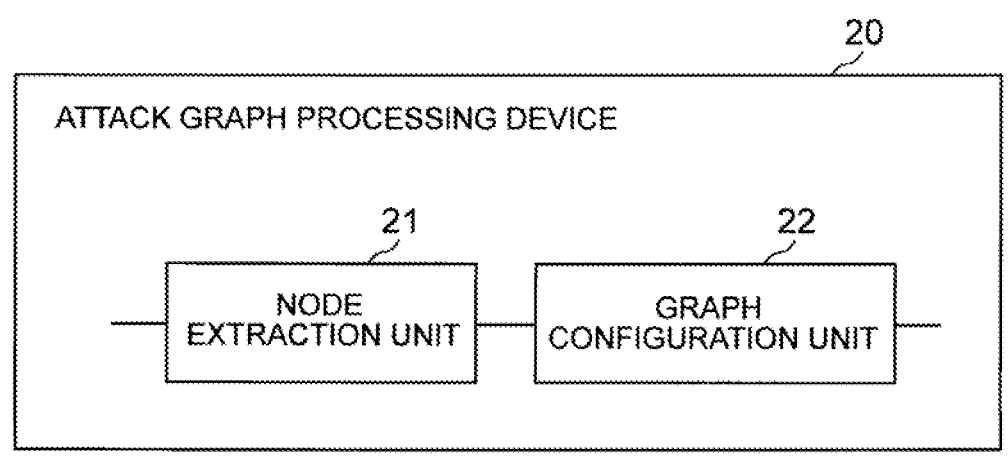
FIG. 23 is a block diagram showing an overview of an attack graph processing device.

Next, an overview of the present invention will be described. FIG. 23 is a block diagram showing an overview of an attack graph processing device. The attack graph processing device 20 is an attack graph processing device includes a node extraction unit 21 (for example, the node extraction unit 110) which extracts a node relating to a rule classified into a predetermined group from an attack graph that is configured from one or more nodes indicating the state of a system to be diagnosed, or the state of the primary agent of an attack on the system to be diagnosed, and one or more edges indicating the relationship among a plurality of nodes, the attack graph being generated using rules indicating a condition in which the attack can be executed, and a graph configuration unit 22 (for example, the graph configuration unit 120) which simplifies the attack graph on the basis of the extracted node.

With the above configuration, the attack graph processing device can easily analyze the attacks in the system to be diagnosed.

The graph configuration unit 22 may simplify the attack graph by deleting nodes other than the extracted node from the attack graph.

With the above configuration, the attack graph processing device can improve the visibility of attacks in the system to be diagnosed.

The node extraction unit 21 may extract the node using classification information that indicates the rule classified into the predetermined group.

With the above configuration, the attack graph processing device can extract nodes from the attack graph on the basis of the classification information.

The classification information may indicate the rule related to the behavior of the primary agent of the attack. The rule related to the behavior of the primary agent of the attack may be the rule that contains information indicating the identifier of the vulnerability.

With the above configuration, the attack graph processing device can extract nodes related to the vulnerability information indicated by the CVE number.

The attack graph processing device 20 may include a rule classification unit (for example, the rule classification unit 160) which classifies one or more rules into groups respectively, and the rule classification unit generates the classification information indicating the rule classified into the predetermined group.

With the above configuration, the attack graph processing device can reliably extract nodes from the attack graph.

The attack graph processing device 20 may include an analysis unit (for example, the analysis unit 170) which generates an attack graph attached with the classification information on the basis of the rule attached with the classification information, and the node extraction unit 21 extracts the node using the classification information from the generated attack graph.

With the above configuration, the attack graph processing device can simplify a large number of attack graphs at a higher speed.

The attack graph processing device 20 may include a simplification policy obtaining unit (for example, the simplification policy obtaining unit 140) in which a policy indicating classification information of a use target is input.

The attack graph processing device 20 may include an attack graph display unit (for example, the attack graph display unit 150) which displays a simplified attack graph.

While the present invention has been explained with reference to the example embodiments and examples, the present invention is not limited to the aforementioned example embodiments and examples. Various changes understandable to those skilled in the art within the scope of the present invention can be made to the structures and details of the present invention.

REFERENCE SIGNS LIST

11 CPU
12 Main storage unit
13 Communication unit
14 Auxiliary storage unit
15 Input unit
16 Output unit
17 System bus
20, 100-103 Attack graph processing device
21, 110 Node extraction unit
22, 120 Graph configuration unit
50-56 Nodes
130 Classification information storage unit
140 Simplification policy obtaining unit
150 Attack graph display unit
160 Rule classification unit
170 Analysis unit
180 Classification information input unit
900 Attack graph generation system

What is claimed is:

1. An attack graph processing device comprising:
a memory storing software instructions; and
one or more processors configured to execute the software instructions to:
extract a node relating to a rule classified into a predetermined group from an attack graph that is configured from one or more nodes indicating a state of a system to be diagnosed, or a state of a primary agent of an attack, which is a state of being able to log in or communicate with a certain host, on the system to be diagnosed, and one or more edges indicating a relationship among a plurality of nodes, the attack graph being generated using rules indicating a condition in which the attack can be executed; and
simplify the attack graph by deleting the one or more nodes that were not extracted.

2. The attack graph processing device according to claim 1, wherein
the one or more processors are configured to execute the software instructions to simplify the attack graph by deleting nodes other than the extracted node from the attack graph.

3. The attack graph processing device according to claim 2, wherein
the one or more processors are configured to execute the software instructions to extract the node using classification information that indicates the rule classified into the predetermined group.

4. The attack graph processing device according to claim 3, wherein
the one or more processors are further configured to execute the software instructions to classify one or more rules into groups, and
the one or more processors are configured to execute the software instructions to generate the classification information indicating the rule classified into the predetermined group.

5. The attack graph processing device according to claim 3, wherein
the classification information indicates the rule related to a behavior of the primary agent of the attack.

6. The attack graph processing device according to claim 5, wherein
the one or more processors are further configured to execute the software instructions to classify one or more rules into groups, and
the one or more processors are configured to execute the software instructions to generate the classification information indicating the rule classified into the predetermined group.

7. The attack graph processing device according to claim 5, wherein
the rule related to the behavior of the primary agent of the attack is the rule that contains information indicating an identifier of the vulnerability.

8. The attack graph processing device according to claim 7, wherein
the one or more processors are further configured to execute the software instructions to classify one or more rules into groups, and
the one or more processors are configured to execute the software instructions to generate the classification information indicating the rule classified into the predetermined group.

9. The attack graph processing device according to claim 1, wherein
the one or more processors are configured to execute the software instructions to extract the node using classification information that indicates the rule classified into the predetermined group.

10. The attack graph processing device according to claim 9, wherein
the classification information indicates the rule related to a behavior of the primary agent of the attack.

11. The attack graph processing device according to claim 10, wherein
the one or more processors are further configured to execute the software instructions to classify one or more rules into groups, and
the one or more processors are configured to execute the software instructions to generate the classification information indicating the rule classified into the predetermined group.

12. The attack graph processing device according to claim 10, wherein
the one or more processors are further configured to execute the software instructions to generate an attack graph attached with the classification information on the basis of the rule attached with the classification information, and
the one or more processors are configured to execute the software instructions to extract the node using the classification information from the generated attack graph.

13. The attack graph processing device according to claim 10, wherein
the rule related to the behavior of the primary agent of the attack is the rule that contains information indicating an identifier of the vulnerability.

14. The attack graph processing device according to claim 13, wherein
the one or more processors are further configured to execute the software instructions to classify one or more rules into groups, and
the one or more processors are configured to execute the software instructions to generate the classification information indicating the rule classified into the predetermined group.

15. The attack graph processing device according to claim 13,
the one or more processors are further configured to execute the software instructions to generate an attack graph attached with the classification information on the basis of the rule attached with the classification information, and
the one or more processors are configured to execute the software instructions to extract the node using the classification information from the generated attack graph.

16. The attack graph processing device according to claim 9, wherein
the one or more processors are further configured to execute the software instructions to classify one or more rules into groups, and
the one or more processors are configured to execute the software instructions to generate the classification information indicating the rule classified into the predetermined group.

17. The attack graph processing device according to claim 9, wherein
the one or more processors are further configured to execute the software instructions to generate an attack graph attached with the classification information on the basis of the rule attached with the classification information, and
the one or more processors are configured to execute the software instructions to extract the node using the classification information from the generated attack graph.

18. The attack graph processing device according to claim 1, further comprising:
an attack graph display which displays a simplified attack graph.

19. An attack graph processing method performed by a computer and comprising:
extracting a node relating to a rule classified into a predetermined group from an attack graph that is configured from one or more nodes indicating a state of a system to be diagnosed, or a state of a primary agent of an attack, which is a state of being able to log in or communicate with a certain host, on the system to be diagnosed, and one or more edges indicating a relationship among a plurality of nodes, the attack graph being generated using rules indicating a condition in which the attack can be executed; and
simplifying the attack graph by deleting the one or more nodes that were not extracted.

20. A non-transitory computer-readable recording medium storing an attack graph processing program causing executable by a computer to perform processing comprising:
extracting a node relating to a rule classified into a predetermined group from an attack graph that is configured from one or more nodes indicating a state of a system to be diagnosed, or a state of a primary agent of an attack, which is a state of being able to log in or communicate with a certain host, on the system to be diagnosed, and one or more edges indicating a relationship among a plurality of nodes, the attack graph being generated using rules indicating a condition in which the attack can be executed; and
simplifying the attack graph by deleting the one or more nodes that were not extracted.

* * * * *